United States Patent
Wilz, Sr. et al.

(10) Patent No.: US 6,510,997 B1
(45) Date of Patent: *Jan. 28, 2003

(54) HAND-SUPPORTABLE BAR CODE SYMBOL READING DEVICE HAVING AN INTEGRATED WORLD WIDE WEB (WWW) BROWSER COMMAND GENERATOR FOR AUTOMATICALLY GENERATING WWW BROWSER PROGRAM COMMANDS TO INITIATE THE EXECUTION OF HYPERTEXT TRANSMISSION PROTOCOL (HTTP) REQUESTS

(75) Inventors: David M. Wilz, Sr., Sewell, NJ (US); Carl Harry Knowles, Morrestown, NJ (US)

(73) Assignee: Metrologic Instruments, Inc., Blackwood, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,238

(22) Filed: Jan. 15, 1999

Related U.S. Application Data

(63) Continuation of application No. 08/846,219, filed on Apr. 25, 1997, now Pat. No. 6,076,733, which is a continuation-in-part of application No. 08/838,501, filed on Apr. 7, 1997, now Pat. No. 5,869,819, which is a continuation-in-part of application No. 08/820,540, filed on Mar. 19, 1997, now Pat. No. 6,068,188, which is a continuation-in-part of application No. 08/753,367, filed on Nov. 25, 1996, now abandoned, which is a continuation-in-part of application No. 08/645,331, filed on May 13, 1996, now Pat. No. 5,844,227, and a continuation-in-part of application No. 08/615,054, filed on Mar. 12, 1996, and a continuation-in-part of application No. 08/573,949, filed on Dec. 18, 1995, now abandoned, and a continuation-in-part of application No. 08/292,237, filed on Aug. 17, 1994, now Pat. No. 5,808,285, and a continuation-in-part of application No. 08/293,493, filed on Aug. 19, 1994, now Pat. No. 5,525,789, and a continuation-in-part of application No. 08/561,479, filed on Nov. 20, 1995, now Pat. No. 5,661,292, and a continuation-in-part of application No. 08/278,109, filed on Nov. 24, 1993, now Pat. No. 5,484,992, and a continuation-in-part of application No. 08/489,305, filed on Jun. 9, 1995, now abandoned, and a continuation-in-part of application No. 08/476,069, filed on Jun. 7, 1995, now Pat. No. 5,591,953, and a continuation-in-part of application No. 08/584,135, filed on Jan. 11, 1996, now Pat. No. 5,616,908.

(51) Int. Cl.$^7$ .................................................. G06K 7/10
(52) U.S. Cl. ............................ 235/472.01; 235/462.01
(58) Field of Search .......................... 414/800; 235/375, 235/462.01, 472.01, 462.04, 462.09, 462.49, 472.02, 472.03

(56) References Cited

U.S. PATENT DOCUMENTS

| | | |
|---|---|---|
| 4,654,482 A | 3/1987 | DeAngelis |
| 4,841,132 A | 6/1989 | Kajitani et al. |
| 5,280,498 A | 1/1994 | Tymes et al. |
| 5,288,976 A | 2/1994 | Citron et al. |
| 5,448,046 A | 9/1995 | Swartz |
| 5,483,052 A | 1/1996 | Smith, III et al. |
| 5,490,217 A | 2/1996 | Wang et al. |
| 5,506,697 A | 4/1996 | Li et al. |
| 5,600,833 A | 2/1997 | Senn et al. |
| 5,635,694 A | 6/1997 | Tuhro |
| 5,640,193 A * | 6/1997 | Wellner ..................... 348/7 |
| 5,692,073 A | 11/1997 | Cass |
| 5,711,648 A * | 1/1998 | Hammerslag ............ 414/786 |
| 5,774,874 A * | 6/1998 | Veeneman et al. ........ 395/227 |
| 5,804,803 A * | 9/1998 | Cragun et al. ............ 235/375 |
| 5,825,002 A | 10/1998 | Roslak |
| 5,869,819 A | 2/1999 | Knowles et al. |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,918,213 A | 6/1999 | Bernard et al. |
| 5,918,214 A | 6/1999 | Perkowski |
| 5,930,767 A | 7/1999 | Reber et al. |
| 5,933,829 A | 8/1999 | Durst et al. |
| 5,938,726 A | 8/1999 | Reber et al. |
| 5,940,595 A | 8/1999 | Reber et al. |
| 5,950,173 A | 9/1999 | Perkowski |
| 5,971,277 A | 10/1999 | Cragun et al. |
| 5,978,773 A | 11/1999 | Hudetz et al. |
| 5,979,757 A | 11/1999 | Tracey et al. |
| 5,986,651 A | 11/1999 | Reber et al. |
| 5,992,752 A | 11/1999 | Wilz, Sr. et al. |

| | | | |
|---|---|---|---|
| 5,995,105 A | 11/1999 | Reber et al. | |
| 6,012,102 A | 1/2000 | Shachar | |
| 6,027,024 A | 2/2000 | Knowles | |
| 6,032,195 A | 2/2000 | Reber et al. | |
| 6,064,979 A | 5/2000 | Perkowski | |
| 6,081,827 A | 6/2000 | Reber et al. | |
| 6,108,656 A | 8/2000 | Durst et al. | |
| 6,138,151 A | 10/2000 | Reber et al. | |
| 6,199,048 B1 | 3/2001 | Hudetz et al. | |

FOREIGN PATENT DOCUMENTS

| | | | | |
|---|---|---|---|---|
| EP | 0 645 728 A2 | 3/1995 | ............ | G06K/7/10 |
| EP | 0 744 856 A2 | 11/1996 | ............ | H04M/3/42 |
| EP | 0 837 406 A2 | 4/1998 | | |
| EP | 0 856 812 A2 | 5/1998 | .......... | G06K/17/00 |
| WO | WO 97/01137 | 1/1997 | | |
| WO | WO 97/37319 | 10/1997 | | |
| WO | WO 98/03923 | 1/1998 | | |
| WO | WO 98/06055 | 2/1998 | | |
| WO | WO 98/09243 | 3/1998 | | |
| WO | WO 98/19259 | 5/1998 | | |
| WO | WO 98/20411 | 5/1998 | | |
| WO | WO 98/38761 | 9/1998 | | |
| WO | WO 98/51035 | 11/1998 | | |
| WO | WO 98/51036 | 11/1998 | | |
| WO | WO 98/51077 | 11/1998 | | |

OTHER PUBLICATIONS

PCT International Search Report, 1997.
PCT International Search Report, 1997.
PCT International Search Report, 1997.
U.S. patent applications Ser. No. 08/691,263, Swift et al., filed Jan. 1, 2000.
AllPen Software Announces NetHopper at PC Expo by Press Release Allpen Software, et al., www.allpen.com, vol. 0, No. 0, 1998, p. 1.
ZooWorks' automatic catalogs enable easy URL sharing by Gess Shanker, Intranet World, 1997.
Bookmarks by David Noack, Web Guide Magazine, 1997, pp. 33–35.
Net Hopper 2.0 The World in the Palm of Your Hands by product description (no author), LandWare, Inc., vol. 0, No. 0, 1997, pp. 1–2.
Magazine Guides That Help the Surfers by John Burks, New York Times, vol. 0, No. 0, 1996, p. D7.
Iris IrisPen by under Reviews/Scanners, MacUser, vol. 0, No. 0, 1996, pp. 54–55.
World–Wide Web: The Information Universe by Tim Berners–Lee, et al., Meckler Media, Westport CT, 1992.

* cited by examiner

*Primary Examiner*—Thien M. Le
(74) *Attorney, Agent, or Firm*—Thomas J. Perkowski; Perkowski, Esq. PC

(57) ABSTRACT

A bar code symbol information driven system for accessing information on the Internet. The system includes a programmed bar code symbol reader having a hand-supportable housing, and an Internet browser program operably connectable to an Internet terminal. The programmed bar code symbol reader has an optical scanning device for optically scanning a bar code symbol encoded with an Uniform Resource Locator (URL) pointing to an information resource on the Internet, and a scan data processor for producing words of digital scan data representative of the width of the bars and spaces of the code symbol. A programmable decoder module is provided within the hand-supportable housing for processing the words of digital scan data and producing symbol character data representative of the decoded bar code symbol. An ASCII code generation module is provided within the housing for generating both an ASCII-based prefix code string representative of the Internet browser program command that writes the URL to the Internet browser program, and a suffix code string representative of the Internet browser program command that executes said HTTP request on said URL. A code string synthesizer module is provided within the housing for synthesizing the prefix and suffix code strings produced from the ASCII code generator, with the URL character string from the programmable decoder module, in order to form a complete code string. A data transmission module is provided for transmitting the complete code string to the Internet Terminal for use in accessing and displaying the Internet information resource specified by the URL encoded within the decoded bar code symbol. By virtue of the present invention, it is possible to read URL-encoded bar code symbols and enter such information into conventional Internet browser programs to automatically access and display corresponding Internet information resources, without the use of special software or hardware acccessories.

12 Claims, 19 Drawing Sheets

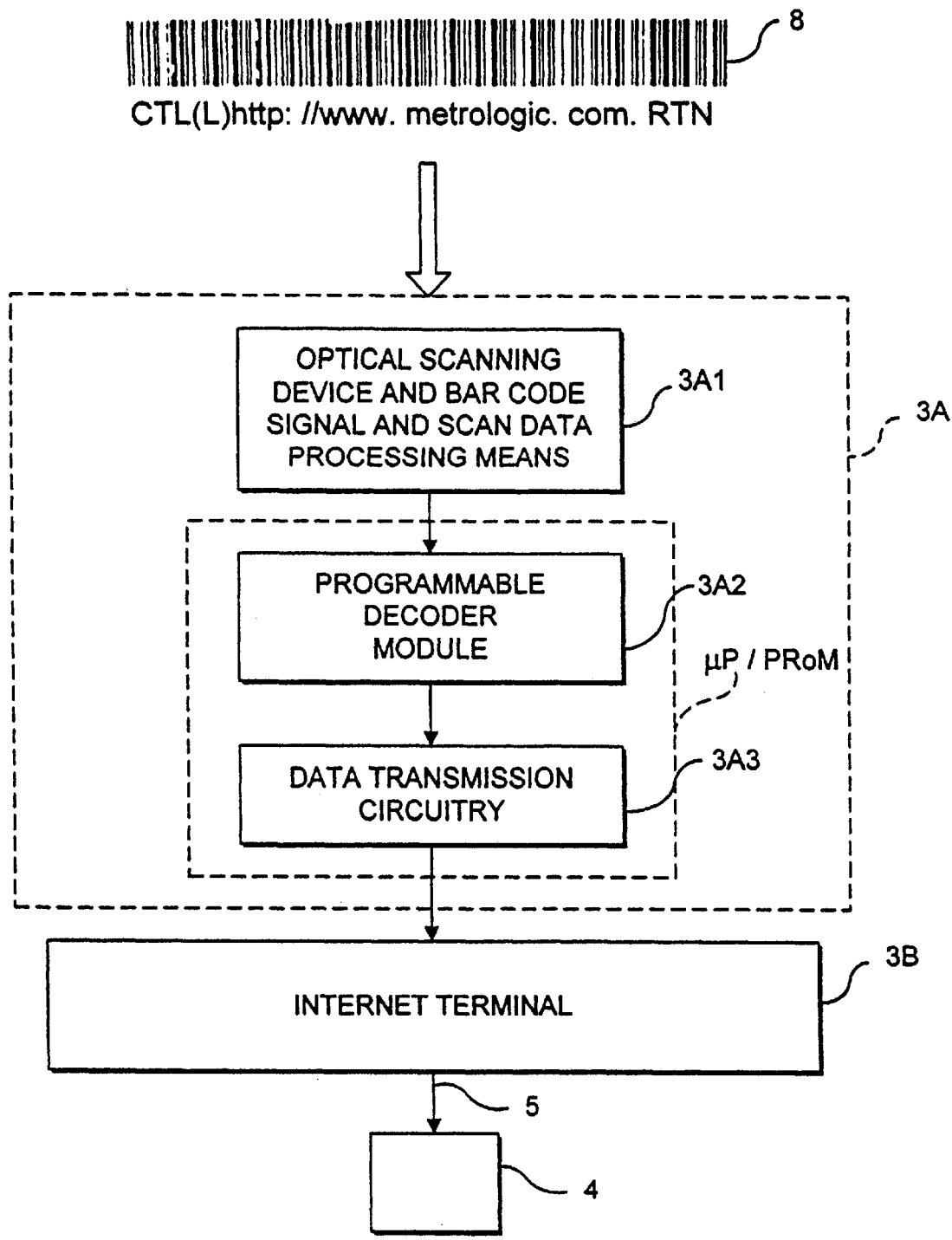
FIG. 1B1

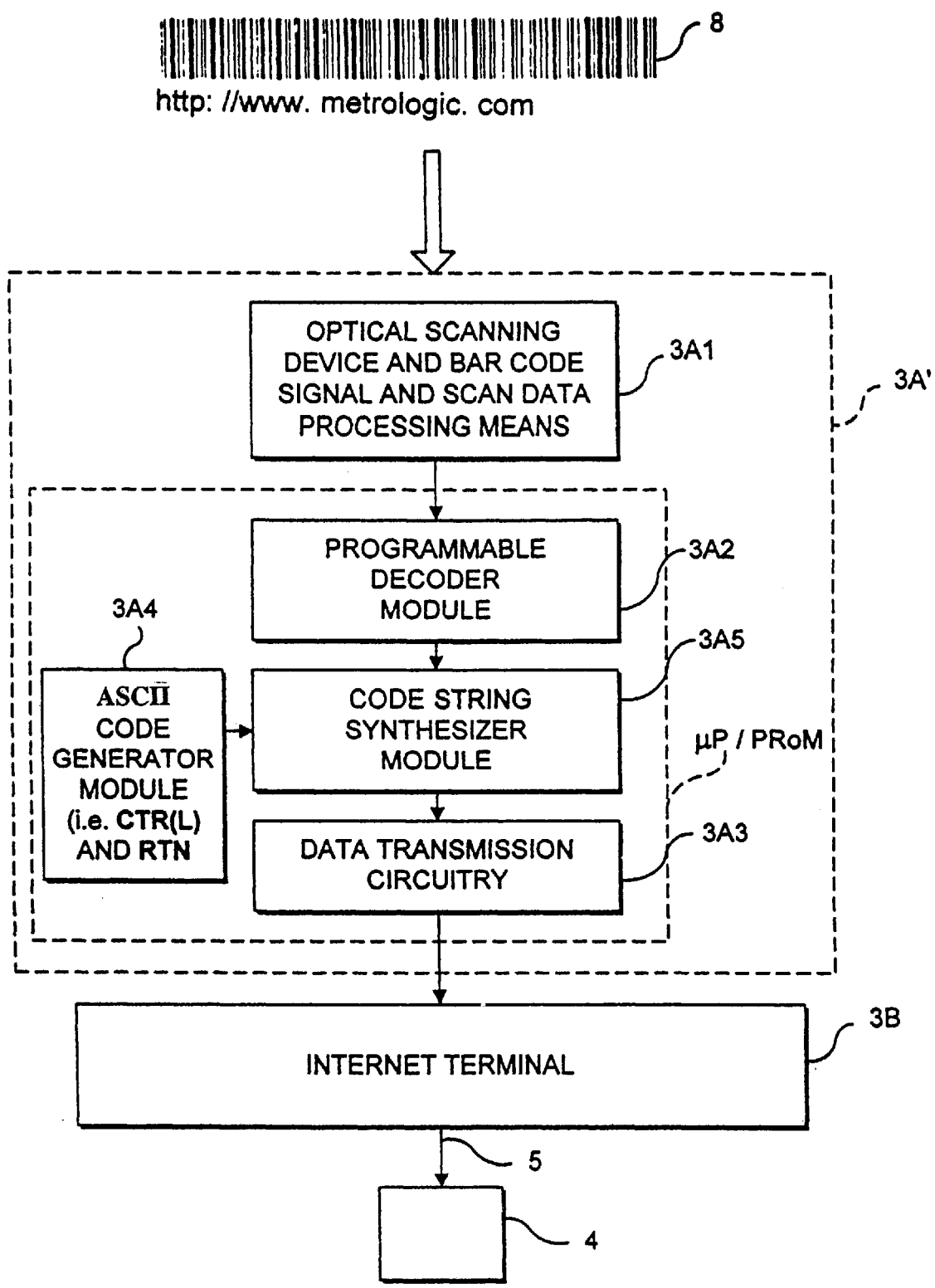
F I G. 1B2

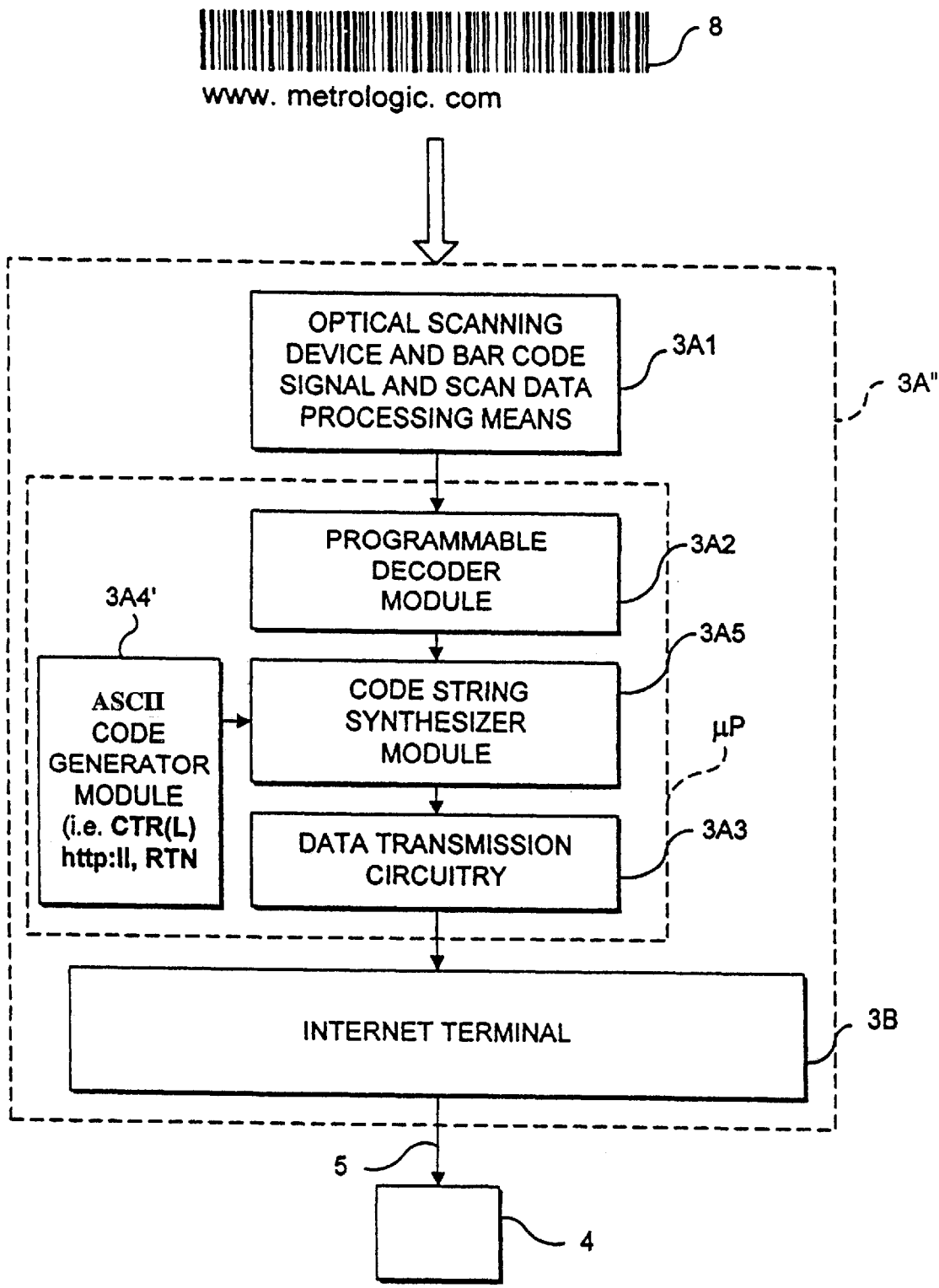
FIG. 1B3

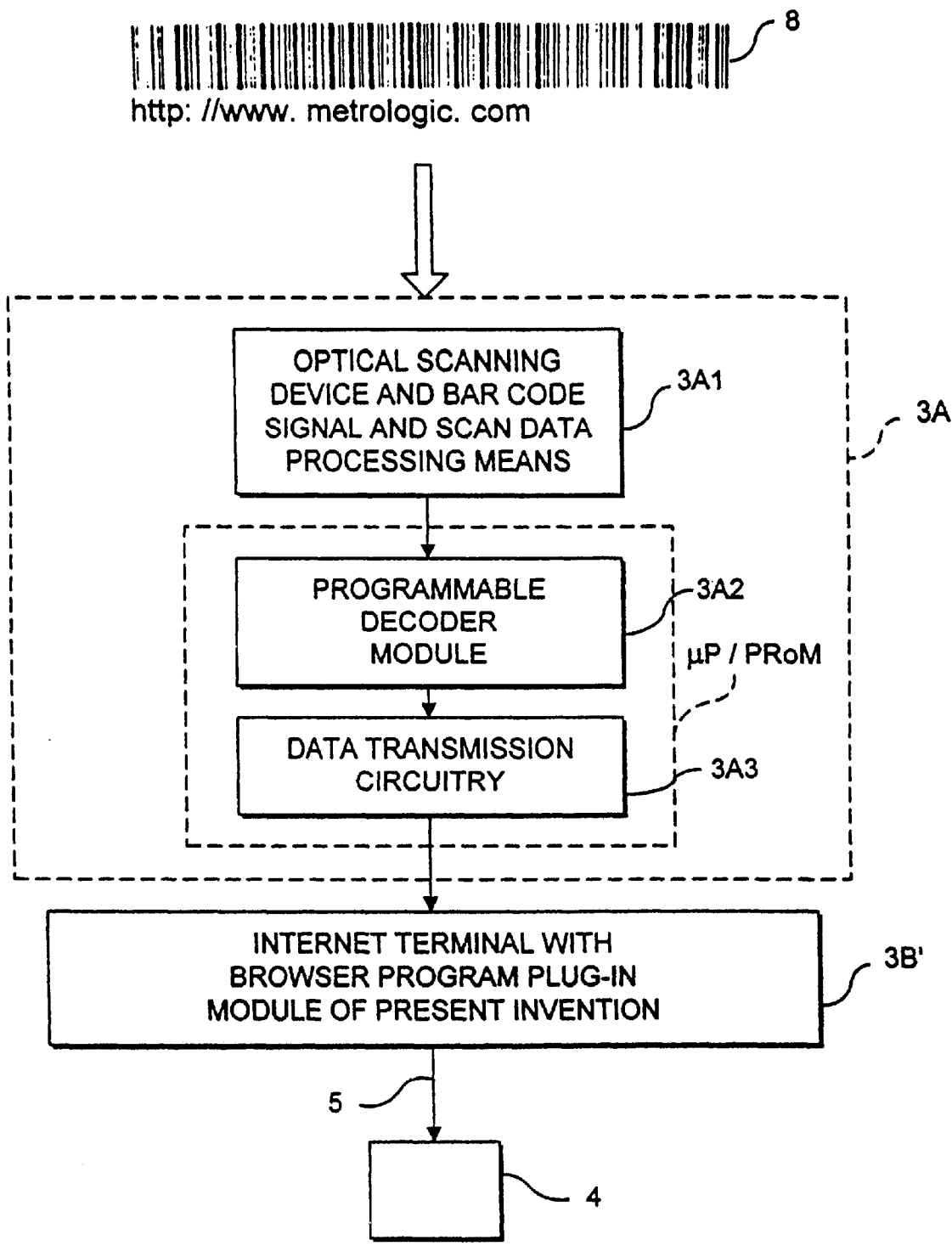
FIG. 1B4

CTL(L) http://www.pepsi.com RTN

F I G. 1C1

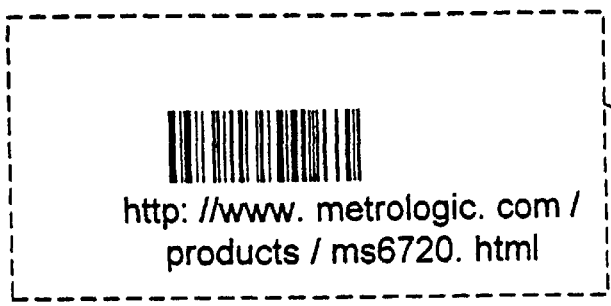
— 38B http://www.metrologic.com/
products/ms6720.html

F I G. 1C2

CTL(L) http://www.metrologic.com RTN

CTL(L)/products/ms6720.html RTN

F I G. 1D1

CTL(L) http://www.clearlake.ibm.com/mfg/bocaraton

F I G. 1D2

CTL(L) http://www.moore.com/labels/
(keyboard/bar coded characters)

F I G. 1E1

0CH 68H 74H 74H 3AH 2FH 77H 77H 77H 2EH 6DH 6FH 72H 63H 6FH 6DH 61H 62H 65H 6CH 73H 2FH Hex signifies hexidecimal and is not transmitted

F I G. 1E2

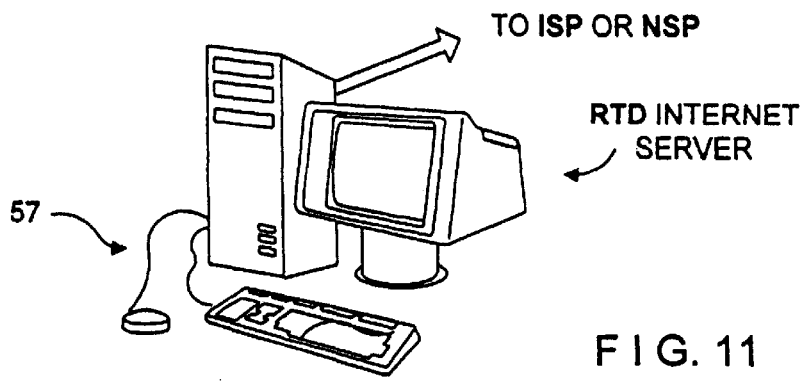
FIG. 11
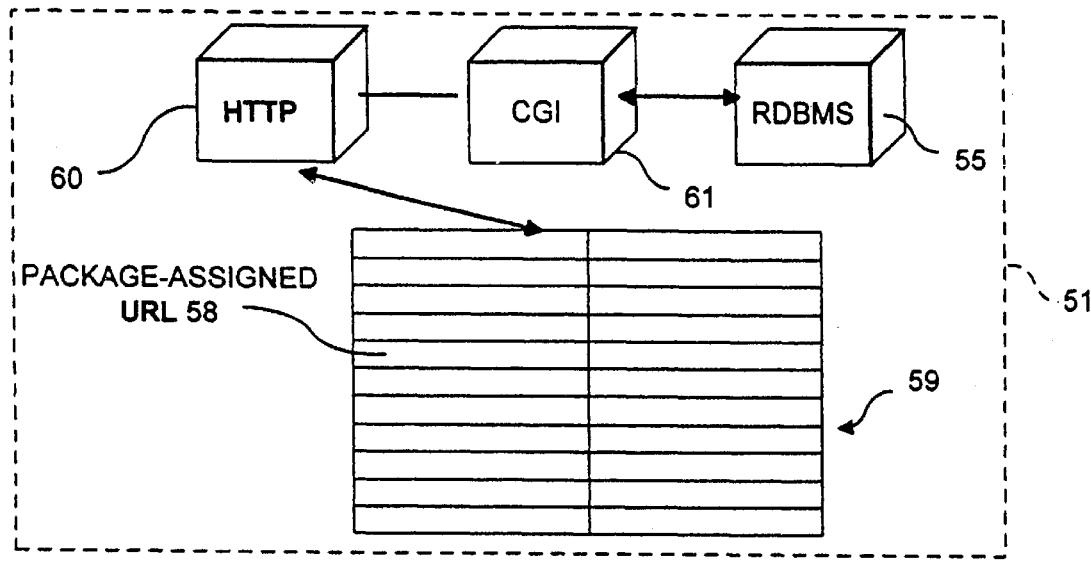
FIG. 11A
FIG. 11B

HAND-SUPPORTABLE BAR CODE SYMBOL READING DEVICE HAVING AN INTEGRATED WORLD WIDE WEB (WWW) BROWSER COMMAND GENERATOR FOR AUTOMATICALLY GENERATING WWW BROWSER PROGRAM COMMANDS TO INITIATE THE EXECUTION OF HYPER-TEXT TRANSMISSION PROTOCOL (HTTP) REQUESTS

RELATED CASES

This Application is a Continuation of application Ser. No. 08/846,219 filed Apr. 25, 1997 now U.S. Pat. No. 6,076,733, which is a Continuation-in-part of application Ser. No. 08/838,501 entitled "Internet-Based System And Method For Tracking Objects Bearing URL-Encoded Bar Code Symbols" by David M. Wilz, Sr. and C. Harry Knowles, filed Apr. 7, 1997 now U.S. Pat. No. 5,869,819, which is a Continuation-in-Part of application Ser. No. 08/820,540 entitled "System And Method For Composing And Printing URL-encoded bar code symbol Lists And Menus For Use In Visiting Internet-Based Information Resources By Scanning The Same" by Harry Knowles, filed Mar. 19, 1997 now U.S. Pat. No. 6,068,188, which is a Continuation-in-part of application Ser. No. 08/753,367 filed Nov. 25, 1996 now abandoned; application Ser. No. 08/645,331 filed May 13, 1996 now U.S. Pat. No. 5,844,227; application Ser. No. 08/615,054 filed Mar. 12, 1996; application Ser. No. 08/573,949 filed Dec. 18, 1995 now abandoned; application Ser. No. 08/292,237 filed Aug. 17, 1994 now U.S. Pat. No. 5,808,285; application Ser. No. 08/293,493 filed Aug. 19, 1994 now U.S. Pat. No. 5,525,789; application Ser. No. 08/561,479 filed Nov. 20, 1995 now U.S. Pat. No. 5,661,292; application Ser. No. 08/278,109 filed Nov. 24, 1993 now U.S. Pat. No. 5,484,992; application Ser. No. 08/489,305 filed Jun. 9, 1995 now abandoned; Ser. No. 08/476,069 filed Jun. 7, 1995 now U.S. Pat. No. 5,591,953; and application Ser. No. 08/584,135 filed Jan. 11, 1996 now U.S. Pat. No. 5,616,908. Each said patent application is assigned to and commonly owned by Metrologic Instruments, Inc. of Blackwood, N.J., and is incorporated herein by reference in its entirety.

BACKGROUND OF INVENTION

1. Field of Invention

The present invention is directed to a novel bar-code symbol driven Internet Access Terminal, and method of accessing Internet-based information resources by scanning bar code symbols encoded with Uniform Resource Locators (URLs) or Domain Name/Path Name (DN/PN) portions thereof indicating the location of such information resources on the Internet.

2. Background of the Invention

Presently, several techniques have been developed for connecting to or accessing (i.e., "surfing" among) Internet-based information resources on the World Wide Web (WWW) using a conventional graphical user interface (GUI) based Internet browser programs, such as the Navigator® from Netscape Communications, Inc. or the Internet Explorer® from Microsoft, Inc. The availability of any particular Web-site surfing technique depends on where the Internet user finds him or her self in the Internet browser program at any particular instant of time.

For example, if one is currently at a Web-site (i.e., in a particular HyperText Markup Language (HTML) document), at which there is a highlighted or embedded "link" specifying the Internet address of another Web-site (i.e., another HTML document), then the user can access (i.e., "surf to") this other Web-site by simply "clicking on" or selecting the highlighted URL with his or her pointing device (i.e., "mouse") in a conventional manner. The ability to connect to other Web-sites by simply pointing and clicking on a highlighted URLs embedded in an HTML document has contributed enormously to the growth and popularity of the Internet in the last few years.

If the user desires to connect to a Web-site that is not referenced in a HTML document viewed through a browser program, then the user oftentimes finds it necessary to manually enter the URL of the Web-site (e.g., "http://www.metrologic.com") into the browser program. This requires manually pressing a sequence of keys on a keyboard or remote control device, corresponding to the characters of the URL being selected. In addition to being time consuming, this Web-site surfing technique is prone to errors, causing the browser program to connect to the wrong Web-site or return a message stating that the Domain Name of the Web-site sought after cannot be found. From a practical point of view, this is quite frustrating to the Internet user.

More recently, with the growth and ever increasing complexity of the WWW, it is becoming popular to use printed publications (e.g., magazines, catalogues, directories, etc.) which list Web-sites, corresponding URLs and content descriptions, as navigational aids, much in same way that the TV GUIDE® magazine is used to help viewers select programs during television viewing. Again, however, each time a listed Web-site is to be viewed, the user is forced to manually enter into the Internet browser program, the lengthy character string associated with the URL of the Web-site being selected. Only thereafter, does the browser program automatically connect the user's client system (i.e., Internet Terminal) to the Internet Server computer supporting the selected Web-site.

While the development of HTML and GUI-based Web browser programs have made accessing Web-sites relatively simple, the above shortcomings and drawbacks of prior art Internet technology clearly indicate a great need in the art for an improved system and method of accessing information resources on the Internet.

OBJECTS AND SUMMARY OF THE PRESENT INVENTION

Accordingly, it is a primary object of the present invention to provide an improved method and apparatus for accessing and navigating among information resources on the Internet, while avoiding the shortcomings and drawbacks of prior art systems and methodologies.

A further object of the present invention is to provide an Internet Access System which includes a bar code symbol reader for reading DN/PN-encoded (Domain Name and Path Name encoded) or URL-encoded (Uniform Resource Location encoded) bar code symbols printed on various types of objects, including print media, which, when read thereby, automatically connects the Internet Access System to the Internet Server that contains the information resource specified by the scanned DN/PN-encoded or URL-encoded bar code symbol.

A further object of the present invention is to provide such Internet Access System, wherein the bar code symbol reader may be a laser scanning bar code symbol reader, a CCD-type bar code symbol, or a Wand-type bar code symbol reader.

A further object of the present invention is to provide such an Internet Access System, wherein the DN-encoded bar code symbol printed on various types of print media is a DN/PN-encoded truncated-type bar code symbol, having a very low height to length ratio, thereby allowing many URL-encoded bar code symbols to be printed on a single sheet or page of a Web-site guide, along with their corresponding human-readable URLs and content descriptions.

A further object of the present invention is to provide such an Internet Access System, wherein the URL-encoded bar code symbol printed on various types of print media is a URL-encoded truncated-type bar code symbol, having a very low height to length ratio, thereby allowing many URL-encoded bar code symbols to be printed on a single sheet or page of a Web-site guide, along with their corresponding human-readable URLs and content descriptions.

Another object of the present invention is to provide such an Internet Access System in the form of a desktop, laptop or palmtop computer system that is connected to the Internet by way of an Internet Service Provider (ISP), wherein the computer system has a GUI-based web browser program and a programmed bar code symbol scanner interfaced therewith for automatically surfing to information resources (e.g., Web-sites) listed in a Web-site guide by simply scanning corresponding URL-encoded bar code symbols printed on the pages thereof.

A further object of the present invention is to provide an Internet Access System in the form of an interactive web-based television system, wherein the web-based television system comprises an Internet terminal unit connected to the Internet by way of an ISP, an audio-visual display monitor for displaying graphical and audio information content of Web-sites, and a portable Internet surfing device having a wireless IR-based communication link to the Internet terminal unit and an integrated bar code symbol scanner for automatically surfing to (or among) Web-sites listed in a Web-site guide by simply scanning corresponding URL-encoded bar code symbols printed on the pages thereof.

A further object of the present invention is to provide such an Internet Access System in the form of a Scanner Integrated Terminal, wherein the Scanner Integrated Terminal is connectable to the Internet by way of a wireless (RF) link to an ISP, and has an integrated GUI-based web browser program, display panel, keypad, and programmed bar code symbol scanner for automatically surfing to Web-sites listed in a Web-site guide by simply scanning corresponding DN-encoded (or URL-encoded) bar code symbols printed on the pages thereof.

Another object of the present invention is to provide a novel method of surfing to Web-sites on the Internet by scanning URL-encoded bar code symbols into GUI-based web browser programs, without the need of manual data entry operations or the like.

A further object of the present invention is to provide an Internet Access System, which includes an optical character reader programmed to read the character strings of URLs printed on various types of print media which, when read thereby, automatically connects the Internet Client System to the Internet Server that supports the Web-site specified by the read URL.

Another object of the present invention is to provide such an Internet Access System in the form of a desktop, laptop or palmtop computer system that is connected to the Internet by way of an Internet Service Provider (ISP), wherein the computer system has a GUI-based web browser program and a programmed optical character reader interfaced therewith for automatically surfing to Web-sites listed in a Web-site guide by simply reading corresponding URLs printed on the pages thereof.

A further object of the present invention is to provide an Internet Access System in the form of an interactive web-based television system, wherein the web-based television system comprises an Internet terminal unit connected to the Internet by way of an ISP, an audio-visual (AV) display monitor for displaying graphical and audio information content of Web-sites, and a portable Internet surfing device having a wireless IR-based communication link to the Internet Terminal unit and an integrated optical character reader for automatically surfing to Web-sites listed in a Web-site guide by simply scanning corresponding URLs printed on the pages thereof.

A further object of the present invention is to provide such an Internet Access System in the form of a Scanner Integrated Terminal, wherein the Scanner Integrated Terminal is connectable to the Internet by way of a wireless (RF) link to an ISP, and has an integrated GUI-based web browser program, display panel, keypad, and programmed optical character reader for automatically surfing to Web-sites listed in a Web-site guide by simply scanning corresponding URLs printed on the pages thereof.

Another object of the present invention is to provide a novel method of surfing to Web-sites on the Internet by optically scanning the character strings of URLs into GUI-based web browser programs, without the need of manual data entry operations and the like.

Another object of the present invention is to provide a novel system and method for printing URL-encoded bar code symbols on various types of print media which, when read thereby, automatically connects the Internet Client System to the Internet Server that supports the Web-site specified by the scanned URL-encoded bar code symbol.

Another object of the present invention is to provide such a system in the form of suitably programmed desktop Web-linked computer workstation or laptop computer system having a graphical user interface and an Internet browser program having a plug-in type URL-Menu Composition/Printing Module that supports the bar code menu composition, transmission and printing processes of the present invention.

A further object of the present invention is to provide such a system, in which the Internet browser program and plug-in URL-Menu Composition/Printing Module allow the user to easily compile the following information structure during operation of the Internet browser program: a list of human-readable URLs corresponding to a set or course of information serving Web-sites, a set of URL-encoded bar code symbol data structures corresponding thereto, a set of titles assigned to the URLs, a set of brief descriptions of content served at the Web-sites, and date or dates the set of Web-sites were last visited by the compiler for subsequent printing in the form of a menu.

A further object of the present invention is to provide such a system, in which the compiled information structure can be electronically transmitted to a remote site, by e-mail, facsimile transmission, or other protocol available over the Internet, and thereafter printed out using appropriate print-driver software, so that the Web-sites listed in the compiled information structure can be easily visited by reading the corresponding URL-encoded bar code symbol into the Internet browser program using a bar code scanner.

Another object of the present invention is to provide a novel Web-site guide or directory comprising one or more sheets having a plurality of URL-encoded bar code symbols, corresponding human-readable URLs and Web-site content descriptions printed thereon.

Another object of the present invention is to provide a novel Web-based document tracking and management system, in which each printed document (e.g., brochure, drawing, 3-D objects or specimens, photograph, specification, blue-print, and the like) to be tracked and managed within the system is uniquely assigned and affixed with a printed URL-encoded bar code symbol that specifies (i.e., points to) a particular information storage location within an HTML-encoded relational database management system (RDBMS), realized on an Web-based information server located on the Internet or behind the corporate firewall of an HTTP-supporting Intranet.

Another object of the present invention is to provide such a Web-based document tracking and management system, in which information relating to a document registered within the system can be easily accessed therefrom by simply scanning the printed URL-encoded bar code symbol on the document using the bar code symbol reader associated with an Internet Access Terminal (i.e., client computer system) of the present invention.

Another object of the present invention is to provide such a Web-based document tracking and management system, in which the Internet Access Terminal of each user can be used to: (1) assign a URL-encoded bar code symbol to any document to be registered with the system; (2) enter document-related information into the information storage location assigned to the document within the Web-based RDBMS; (3) print out URL-encoded bar code symbols for attachment to corresponding documents registered within the system; (4) modify at any time the document-related information currently stored in the information storage location assigned to the document within the Web-based RDBMS; and (5) access such document related information from the system by simply reading its corresponding URL-encoded bar code symbol.

Another object of the present invention to provide a Web-based package routing, tracking and delivering system and method that uses URL-encoded bar code symbols on parcels and packages.

A further object of the present invention is to provide such a Web-based package routing, tracking and delivery system and method, wherein one or more Routing, Tracking and Delivery (RTD) Internet Server Subsystems are connected to the Internet and updated at any instant of time with package related information produced by either (i) a Package Log-In/Shipping Subsystem that is located at a product shipping location (e.g., warehouse) and connected to the RTD Internet Server by a first data communication link, (ii) a Package Routing Subsystem that is located at a hub station and connected to the RTD Internet Server by a second data communication link, or (iii) a Portable Package Delivery Subsystem that is carried by the package delivery person and connected to the RTD Internet Server by a wireless data communication link.

A further object of the present invention is to provide such a Web-based package routing, tracking and delivery system and method, wherein at each remote hub station within the system: the URL/ZIP-CODE encoded bar code symbol is automatically scanned; the encoded destination Zip Code is locally recovered and used to route the package at the hub station; and the locally recovered URL is used to access the RTD Internet Server and update the location of the package within the system.

Another object of the present invention is to provide such a Web-based package routing, tracking and delivery system and method, wherein when the URL/ZIP-CODE Encoded bar code symbol is read by the deliveryman or courier using a portable (wireless) Internet Access Terminal, the recovered URL is used to automatically access the RTD Internet Server and display on the Internet Access Terminal, precise up-to-date parcel delivery information, payment-method terms, handling instructions and the like.

These and other Objects of the Present Invention will become apparent hereinafter.

BRIEF DESCRIPTION OF THE DRAWINGS

For a more complete understanding of how to practice the Objects of the Present Invention, the following Detailed Description of the Illustrative Embodiments should be read in conjunction with the accompanying Drawings, wherein:

FIG. 1B(1) is a schematic diagram of a bar code-driven Internet Access System according to a first generalized embodiment of the present invention, shown reading a bar code symbol that has been encoded with (i) the program command that writes the URL into the information resource "Goto" window (i.e. "Goto" buffer) of the Internet browser program, (ii) the complete URL of an Internet information resource to be accessed, and (iii) the Internet browser program command that executes a Hyper-Text Transmission Protocol (HTTP) request on the URL entered into the "Goto" window;

FIG. 1B(2) is a schematic diagram of a bar code-driven Internet Access System according to a second generalized embodiment of the present invention, for automatically (i) reading a bar code symbol that has been encoded with the complete URL of an Internet information resource to be accessed, and (ii) affixing thereto a prefix code string representative of the program command that writes the URL into the information resource "Goto" window of the Internet browser program, and a suffix code string representative of the program command that executes a HTTP request on the URL entered into the "Goto" window;

FIG. 1B(3) is a schematic diagram of a bar code-driven Internet Access System according to a third generalized embodiment of the present invention, for automatically (i) reading a bar code symbol that has been encoded with only the Domain Name ((DN) or underlying IP address) and server Path Name portion of the URL of an Internet information resource to be accessed, (ii) affixing thereto prefix code strings representative of (1) the program command that writes the URL into the information resource "Goto" window of the Internet browser program and (2) the Internet protocol identifier (e.g., "http://"), and (iii) affixing thereto suffix code strings representative of the program command that executes a HTTP request on the URL entered into the "Goto" Window;

FIG. 1B(4) is a schematic diagram of a bar code-driven Internet Access System according to a fourth generalized embodiment of the present invention for automatically (i) reading a bar code symbol that has been encoded with the complete URL of an Internet information resource to be accessed, (ii) writing the URL into the information resource "Goto" window of the Internet browser program, and (iii) executing a HTTP request on the URL entered into the "Goto" window;

FIG. 1C(1) is a graphical representation of an exemplary 1-D (linear) URL-encoded bar code symbol of the present invention, containing ASCII code elements representative of the complete URL of an Internet information resource to be accessed (e.g., http://www.pepsi.com) as well as the program command (e.g., CTL(L)) that writes the URL into the information resource "Goto" window of the Internet browser program and the program command (e.g., RTN) that execute a HTTP request on the URL entered into the "Goto" window;

FIG. 1C(2) is a graphical representation of an exemplary 2-D URL-encoded bar code symbol of the PDF417 Symbology, encoded according to the principles of the present invention;

FIG. 1D(1) is a graphical representation of an exemplary "multiple 1-D" URL-encoded bar code symbol structure according to the present invention, comprising a pair of discrete 1-D URL-encoded bar code symbols, wherein the first bar code symbol contains ASCII code elements representative of the program command (e.g., CTL(L)) that writes the URL into the information resource "Goto" window of the program, the complete URL of an Internet information resource to be accessed (e.g., http://www.metrologic.com), and the Internet browser program command (e.g., RTN) that executes an HTTP request on the URL entered into the "Goto" window, whereas the second bar code symbol contains ASCII code elements representative of the Internet browser program command (e.g., CTL(L)) that writes the URL into the information resource "Goto" window of the Internet browser program, the Path Name portion of the URL of the Internet information resource to be accessed (e.g., /Products/ms6720.html), and the program command (e.g., RTN) that executes an HTTP request on the URL entered into the "Goto" window;

FIG. 1D(2) is a graphical representation of an exemplary 1-D URL-encoded bar code symbol of the present invention, containing ASCII code elements representative of the program command (e.g., CTL(L)) that writes the URL into the information resource "Goto" window of the Internet browser program, the complete URL of an Internet information resource to be accessed (e.g., http://www.clearlake.ibm.com) including the Path Name portion thereof (e.g., /Mfg/bocaraton), and the program command (e.g., RTN) that executes an HTTP request on the entered URL upon the reading of the bar code symbol;

FIG. 1E(1) is a graphical representation of an exemplary 1-D URL-encoded bar code symbol of the present invention, containing ASCII code elements representative of the Internet browser program command (e.g., CTL(L)) that writes the URL into the information resource "Goto" window of the Internet browser program, the complete URL of an Internet information resource to be accessed (e.g., http://www.moore.com) including the Domain Name (e.g., moore.com) and Path Name portion thereof (e.g., //labels), and the Internet browser program command (e.g., RTN) that executes an HTTP request on the entered URL upon the reading of the bar code symbol;

FIG. 1E(2) is a graphical representation of the hexidecimal number string corresponding to the exemplary 1-D URL-encoded bar code symbol of FIG. 1E(1) that is transmitted from the bar code symbol reader to the Internet browser program of the Internet Access System of the present invention;

FIG. 11 is a schematic representation of a RTD Internet Server (Subsystem) of the Web-based RTD System of the present invention;

FIG. 11A is a schematic representation of the information architecture of the RTD Internet Server of the Web-based RTD System of the present invention, showing its relational database management system (RDBMS), Common Gateway Interface (CGI), and HTTP Server serving an HTML-encoded web-page having URL-specified information storage fields represented therein;

FIG. 11B is a schematic representation of an information structure comprising information elements stored in the RDBMS of the RTD Internet Server that are linked to an information storage location in an HTML-encoded web-page which is specified by a Uniform Resource Locator (URL) that has been uniquely assigned to a particular package being tracked within the RTD system of the present invention;

DETAILED DESCRIPTION OF THE ILLUSTRATIVE EMBODIMENTS OF THE PRESENT INVENTION

The illustrative embodiments of the present invention will be described with reference to the figure drawings wherein like elements and structures are indicated by like reference numbers.

Overview of the Internet Access System Hereof

In general, the system and method of the present invention is practiced in connection with a globally-based digital telecommunications network (known as the Internet). The function of the Internet is to provide an infrastructure that supports wired and wireless digital telecommunications throughout the world using the well known TCP/IP networking protocols. In general, the Internet infrastructure comprises Internet Service Providers (ISPs), Network Service Providers (NSPs), routers, telecommunication lines and channels. etc., all well known in the art.

Figure 1:
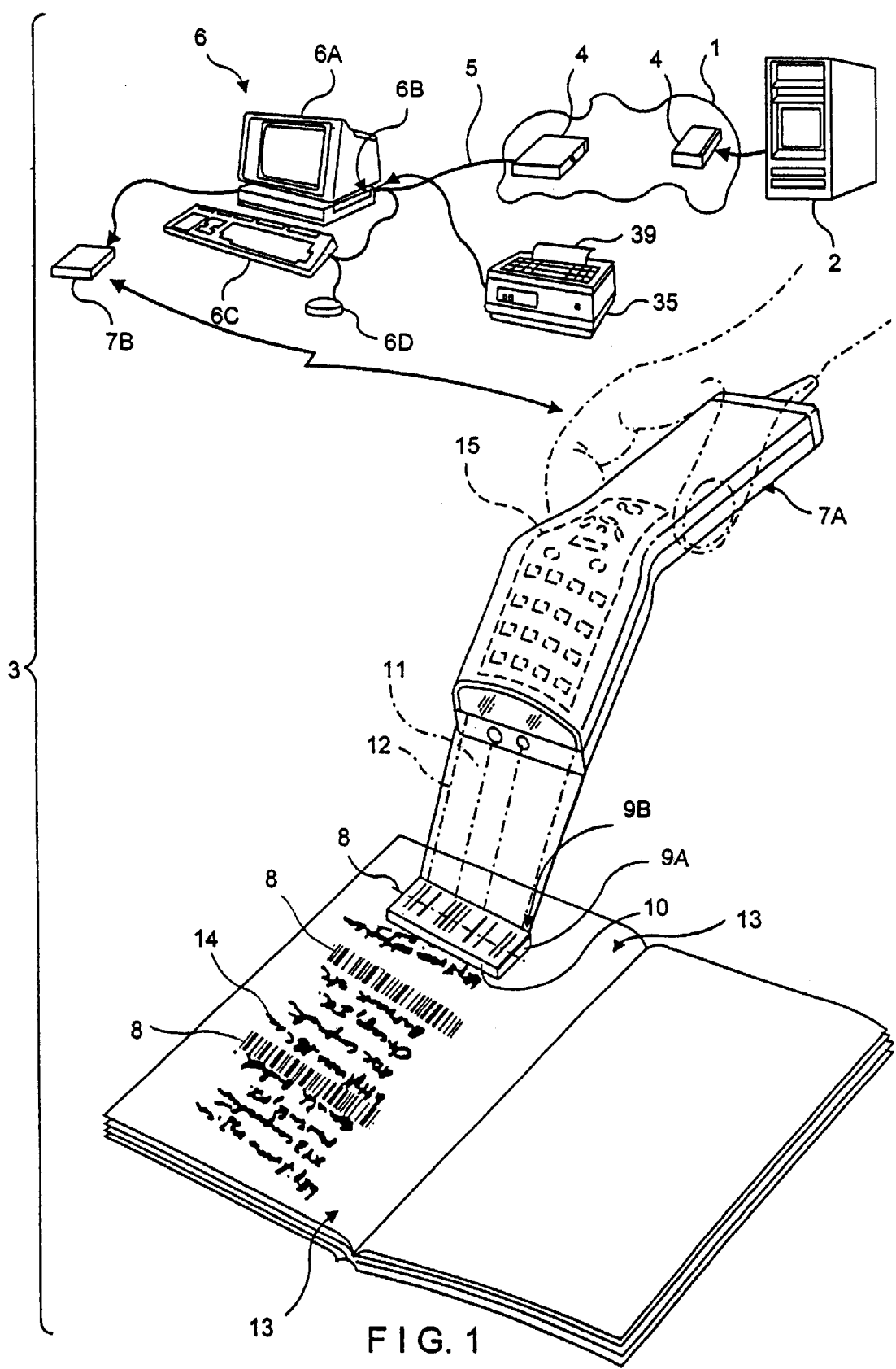
FIG. 1 is a schematic diagram of the first preferred embodiment of the present invention, in which the Internet Access System hereof is realized in the form of a desktop computer system shown connected to the Internet by way of an ISP, and having a GUI-based web browser program and a bar code symbol scanner for automatically surfing to Web-sites listed in a Web-site guide by simply scanning corresponding URL-encoded bar code symbols printed on the pages thereof.

As shown in FIG. 1, many Internet Web-site Servers (i.e., server computer systems) 2 physically located throughout the world are connected to the Internet 1 by way of the Internet infrastructure (i.e., ISPs and NSPs). As the name implies, the function of an Internet Server 2 is to serve information resources to Internet users when requested to do so by a client computer system. The location of each and every information resource on an information server connected to the Internet infrastructure is specified by a Uniform Resource Locator (URL), the syntax of which is well known in the art. Any client computer system that provides access to such information resources by scanning one or more URL-encoded bar code symbols in accordance with the principles taught herein shall hereinafter be referred to as an "Internet Access System" or "Internet Access Terminal", generally indicated by reference number 3 in the drawings.

In general, each Internet Information Server 2 and client system 3 may be connected to the Internet infrastructure by way of an ISP 4 (or NSP) using physical communication media or a wireless (RF-based) digital communication link 5 well known in the art. Notably, while each illustrative embodiment of the Internet Access System hereof is realized in the form of a Client System operably connected to the infrastructure of the Internet by way of an ISP, it is understood that the Internet connection may be achieved through an NSP or other access point in the Internet infrastructure.

In the illustrative embodiments, each Internet Web-site Server 2 is realized as a computer system running conventional Web-site server software (e.g., WebStar™ from StarNine, Inc., FASTRAK® Server from Netscope Communications, Inc, or Microsoft® Internet Information Server from Microsoft Corporation) and is interfaced with an ISP in a conventional manner. Each Internet Web-site Server is assigned a unique TCP/IP address (and Domain Name) on the Internet, and is provided with Internet networking software to support the TCP/IP protocol. In addition, each Internet Web-site server is provided with one or more application software programs for creating and maintaining hypermedia documents containing text, graphics and audio information within an information file structure expressed in HTML. Each HTML document on the WWW is physically stored in an Internet Server 2. The location of such information storage on the WWW is specified by its URL. The function of a URL is best illustrated by way of example. Metrologic Instruments, Inc., the assignee of the present invention, has launched a WWW site having a "home page" (i.e., first page) specified by the following URL: "http://www.metrologic.com". The type of information maintained at this Web-site, beginning with Metrologic's home page, can be virtually any type of information (e.g. of a multi-media nature) and typically will be periodically or continuously updated to reflect changes in the company, its products, its services and the like. The same is generally true for each and every other Web-site on the Internet, regardless of the type of information being served to requesting client systems.

In general, there are several different ways of accessing information resources on the Internet by scanning URL-encoded or DN-encoded bar code symbols in accordance with the present invention. Four generalized methods of accessing information resources on the Internet using URL-encoded bar code symbols are illustrated in FIGS. 1B(1), 1B(2), 1B(3) and 1B(4). Each of these generalized methods can be carried out within the particular illustrative embodiments of the Internet Access System shown in FIGS. 1, 2 and 3 to be described in great detail hereinafter.

First Generalized Method of Information Resource Access on the Internet Using URL-encoded Code Symbols In FIG. 1B(1), a first generalized method of accessing information on the Internet using URL-encoded bar code symbols is illustrated. As shown, this access method can be carried out using an Internet Access System 3 comprising two primary subsystem components, namely: (1) a programmed bar code symbol reader 3A; and (2) an Internet Terminal 3B. The primary function of the programmed bar code symbol reader 3A is to read a bar code symbol that has been encoded with (i) the Internet browser program command that writes the URL into the information resource ""Goto"" window (i.e. "Goto" buffer) of the Internet browser program, (ii) the complete URL of an Internet information resource to be accessed, and (iii) the Internet browser program command that executes a Hyper-Text Transmission Protocol (HTTP) request on the URL entered into the "Goto" window. The function of the Internet Terminal 3B is to: (1) provide an interconnection to the Internet infrastructure by way of ISP 4 (or NSP) using communication media or link 5; and (2) carry out the client-side of the Internet protocol (e.g., HTTP, FTP, etc.) required to access and display the particular information resource specified by the URL encoded within the bar code symbol.

In general, programmed bar code symbol reader 3A comprises a number of subsystem components, namely: an optical scanning device and scan data processor means 3A1 (e.g., bar code laser scanner, CCD-based bar code scanner, etc.); programmable decoder module 3A2 (e.g., programmed microprocessor with control and decoding algorithms); and data transmission module 3A3. The function of the optical scanning device and scan data processor means 3A1 is to optically scan bar code symbols, and produce words of digital scan data (representative of the length of the bars and spaces of the code symbol) for use in subsequent decode processing. The function of the programmable decoder module 3A2 is to process these words of digital scan data and produce ASCII-based symbol character data representative of the decoded bar code symbol. The function of data transmission circuitry 3A3 is to transmit the ASCII formatted data from decoder module 3A2 to Internet Terminal 3B for use in accessing and displaying the particular information resource specified by the URL encoded within the decoded bar code symbol.

In FIG. 1B(1), the Internet Access System of the first generalized embodiment is shown reading a single 1-D URL-encoded bar code symbol. In this generalized embodiment, the URL-encoded bar code symbol contains ASCII code elements that are representative of the following information items: (1) the Internet browser program command (e.g., CTL(L) ) that writes the URL into the information resource "Goto" window of the Internet browser program; (2) the complete URL of the Internet information resource to be accessed (e.g., http://www.metrologic.com); and (3) the Internet browser program command (e.g., RTN) that executes an HTTP request on the URL entered into the "Goto" window. It is understood, however, such information may be encoded into a 2-D bar code symbol as shown in FIG. 1C(2), or alternatively into two or more 1-D URL-encoded bar code symbols, as shown in FIG. 1D(1).

In FIG. 1D(1), a pair of bar code symbols are used to encode the information contained in the bar URL-encoded bar code of FIG. 1C(1). In such an embodiment, the first bar code symbol contains ASCII code elements representative of: (1) the Internet browser program command (e.g., CTL (L)) that writes the URL into the information resource "Goto" window of the Internet browser program; (2) the complete URL of an Internet information resource to be accessed (e.g., http://www.metrologic.com); and (3) the Internet browser program command (e.g., RTN) that executes an HTTP request on the URL entered into the "Goto" window. The second bar code symbol contains ASCII code elements representative of: (1) the Internet browser program command (e.g., CTL(L)) that writes the URL into the information resource "Goto" window of the Internet browser program; (2) the Path Name portion of the URL of the Internet information resource to be accessed (e.g., /Products/ms6720.html); and (3) the Internet browser program command (e.g., RTN) that executes an HTTP request on the URL entered into the "Goto" window. In either of the above illustrative embodiments, it will be common for URL-encoded bar code symbols to include a Path Name portion thereof (e.g., /Mfg/bocaraton), as illustrated in FIG. 1D(2), which may be of a substantial character length in many instances.

These alternative coding techniques can be advantageous where the character length of the URL becomes significantly large, as in the case where the information resource to be accessed is located deep within a number of subdirectories or subfolders of an information server, or within a back-end database connected to the information server by way of a CGI or like mechanism.

At this juncture, a brief discussion about information formats and bar code symbologies is in order. In general, the information that must be encoded into the structure of a bar code symbol in accordance with the present invention is expressible in the ASCII data format. This fact is based on the nature of the characters used in URL specification, browser design and keyboard construction. Thus, any bar code symbology capable of representing the characters in the ASCII character set can be used to practice the information encoding technique of the present invention. In the preferred embodiment, any one of the following bar code symbologies can be used for URL-encoding: Code 128; full ASCII character set of Code 39; and Code 93. While an ASCII formatted character string has been encoded within the bar code symbol of FIG. 1E(1), the information string actually transmitted from bar code symbol reader 3A to the Internet browser program (of the Internet Terminal 3B) will be typically expressed in the hexidecimal number format shown in FIG. 1E(2). It is understood, however, that the format of the transmitted information string may differ from embodiment to embodiment of the present invention.

Second Generalized Method of Information Resource Access on the Internet Using URL-encoded Code Symbols In FIG. 1B(2), a second generalized method of accessing information on the Internet using URL-encoded bar code symbols is illustrated. As shown, this access method can be carried out using an Internet Access System 3 comprising two primary subsystem components, namely: (1) a programmed bar code symbol reader 3A'; and (2) Internet Terminal 3B. The function of the programmed bar code symbol reader 3A' is to: (i) read a bar code symbol that has been encoded with the complete URL of an Internet information resource to be accessed; and (ii) affix thereto a prefix code string (i.e. CTR(L)) representative of the Internet browser program command that writes the URL into the information resource "Goto" window of the Internet browser program, and a suffix code string (i.e. RTN) representative of the Internet browser program command that executes an HTTP request on the URL entered into the "Goto" window. The function of the Internet Terminal 3B is to: (1) provide an interconnection to the Internet infrastructure by way of ISP 4 (or NSP) using communication media or link 5; and (2) carry out the client-side of the Internet protocol (e.g., HTTP, FTP, etc.) required to access and display the particular information resource specified by the URL encoded within the bar code symbol.

In general, programmed bar code symbol reader 3A' comprises a number of subsystem components, namely: optical scanning device and scan data processor 3A1 (e.g., bar code laser scanner, CCD-based bar code scanner, etc.); programmable decoder module 3A2 (e.g., programmed microprocessor with control and decoding algorithms); data transmission circuitry 3A3; an ASCII code generation module 3A4; and a code string synthesizer module 3A5. The function of the optical scanning device and scan data processor 3A1 is to scan bar code symbols, and produce words of digital scan data (representative of the length of the bars and spaces of the code symbol) for subsequent decode processing. The function of the programmable decoder module 3A2 is to process such words of digital scan data and produce ASCII-based symbol character data representative of the decoded bar code symbol. The function of the ASCII code generation module 3A3 is to generate (1) an ASCII-based prefix code string (i.e. CTR(L)) representative of the Internet browser program command that writes the URL into the information resource "Goto" window of the Internet browser program, and (2) a suffix code string (i.e. RTN) representative of the Internet browser program command that executes an HTTP request on the URL entered into the "Goto" window. The function of the code string synthesizer module 3A5 is to synthesize the prefix and suffix code strings produced from ASCII code generator 3A4, with the URL character string from programmable decoder module 3A2, in order to form a complete code string for transmission to the Internet browser program by way of data transmission circuitry 3A3. The function of data transmission circuitry 3A3 is to transmit ASCII formatted data from the code string synthesizer module 3A5 to Internet Terminal 3B for use in accessing and displaying the particular information resource specified by the URL encoded within the decoded bar code symbol.

In FIG. 1B(2), the Internet Access System of the second generalized embodiment is shown reading a single 1-D URL-encoded bar code symbol. In this generalized embodiment, the URL-encoded bar code symbol contains ASCII code elements representative of the complete URL of an information resource to be accessed from the Internet (e.g., http://www.metrologic.com). It is understood, however, that the information encoded within the 1-D bar code symbol structure of FIG. 1B(2) can be encoded into a 2-D bar code symbol structure or a pair of 1-D bar code symbols as described hereinabove.

Third Generalized Method of Information Resource Access on the Internet Using URL-encoded Code Symbols In FIG. 1B(3), a third generalized method of accessing information on the Internet using URL-encoded bar code symbols is illustrated. As shown, this access method can be carried out using an Internet Access System 3 comprising two primary subsystem components, namely: (1) a programmed bar code symbol reader 3A; and (2) an Internet Terminal 3B. The function of the programmed bar code symbol reader 3A is to: (i) read a bar code symbol that has been encoded with the complete URL of an Internet information resource to be accessed; (ii) affix thereto prefix code strings representative of (1) the Internet browser program command that writes the URL into the information resource "Goto" window of the Internet browser program and (2) the Internet protocol identifier (e.g., "http://"); and (iii) affix thereto a suffix code string representative of the Internet browser program command that executes an HTTP request on the URL entered into the "Goto" Window. The function of the Internet Terminal 3B is to: (1) provide an interconnection to the Internet infrastructure by way of ISP 4 (or NSP) using communication media or link 5; and (2) carry out the client-side of the Internet protocol (e.g., HTTP, FTP, etc.) required to access and display the particular information resource specified by the URL encoded within the bar code symbol.

In general, programmed bar code symbol reader of this illustrative embodiment 3A" comprises a number of subsystem components, namely: optical scanning device and scan data processor 3A1 (e.g., bar code laser scanner, CCD-based bar code scanner, etc.); programmable decoder module 3A2 (e.g., programmed microprocessor with control and decoding algorithms); data transmission circuitry 3A3; an ASCII code generation module 3A4; and a code string synthesizer module 3A5. The function of the optical scanning device and scan data processor 3A1 is to scan bar code symbols, and produce words of digital scan data (representative of the length of the bars and spaces of the code symbol) for subsequent decode processing. The function of the programmable decoder module 3A2 is to process these words of digital scan data and produce ASCII-based symbol character data representative of the decoded bar code symbol. The function of the ASCII code generation module 3A4', is to generate: (1) an ASCII-based prefix code string (i.e. CTR(L)) representative of the Internet browser program command that writes the URL into the information resource "Goto" window of the Internet browser program; (2) the appropriate Internet protocol identifier (e.g., //http://"); and (3) a suffix code string (i.e. RTN) representative of the Internet browser program command that executes an HTTP request on the URL entered into the "Goto" window. The function of code string synthesizer module 3A5 is to synthesize the URL character code produced by decoder module 3A2, with the code strings produced by ASCII code generator 3A4, in order to form a complete code string for transmission to the Internet browser program by way of data transmission circuitry 3A3. The function of data transmission circuitry 3A3 is to transmit ASCII formatted data from the code string synthesizer module 3A5 to Internet Terminal 3B for use in accessing and displaying the particular information resource specified by the URL encoded within the decoded bar code symbol.

In FIG. 1B(3), the Internet Access System of the third generalized embodiment is shown reading a single 1-D URL-encoded bar code symbol. In this generalized embodiment, the URL-encoded bar code symbol contains ASCII code elements representative of the complete URL of an Internet information resource to be accessed. It is understood, however, that the information encoded within the 1-D bar code symbol structure of FIG. 1B(3) can be encoded into a 2-D bar code symbol or a pair of bar code symbols as indicated hereinabove.

Fourth Generalized Method of Information Resource Access on the Internet Using URL-encoded Code Symbols In FIG. 1B(4), a fourth generalized method of accessing information on the Internet using URL-encoded bar code symbols is illustrated. As shown, this access method can be carried out using an Internet Access System 3 comprising two primary subsystem components, namely: (1) a programmed bar code symbol reader 3A; and (2) an Internet Terminal 3B'. The function of programmed bar code symbol reader 3A is to read a bar code symbol that has been encoded with the complete URL of an Internet information resource to be accessed. The function of Internet Terminal 3B' is to: (1) provide an interconnection to the Internet infrastructure by way of ISP 4 (or NSP) using communication media or link 5; and (2) carry out the client-side of the Internet protocol (e.g., HTTP, FTP, etc.) using an Internet browser program (e.g., with a plug-in module) which, upon scanning a bar code symbol, automatically writes the URL thereof into the information resource "Goto" window of the Internet browser program and executes an HTTP request on the URL entered into the "Goto" Window.

In general, programmed bar code symbol reader of this illustrative embodiment 3A comprises a number of subsystem components, namely: optical scanning device and scan data processor 3A1 (e.g., bar code laser scanner, CCD-based bar code scanner, etc.); programmable decoder module 3A2 (e.g., programmed microprocessor with control and decoding algorithms); and data transmission module 3A3. The function of the optical scanning device and scan data processor 3A1 is to optically scan bar code symbols, and produce words of digital scan data (representative of the length of the bars and spaces of the code symbol) for subsequent decode processing. The function of the programmable decoder module 3A2 is to process these words of digital scan data and produce ASCII-based symbol character data representative of the decoded bar code symbol. The function of data transmission circuitry 3A3 is to transmit ASCII formatted data from programmable decoder module 3A2 to Internet Terminal 3B for use in accessing and displaying the particular information resource specified by the URL encoded within the decoded bar code symbol.

In FIG. 1B(4), the Internet Access System of the fourth generalized embodiment is shown reading a single 1-D URL-encoded bar code symbol. In this generalized embodiment, the URL-encoded bar code symbol contains ASCII code elements representative of the complete URL of an Internet information resource to be accessed (e.g., http://www.metrologic.com). It is understood, however, that the information encoded within the bar code symbol structure of FIG. 1B(4) can be encoded into a 2-D bar code symbol or a pair of 1-D bar code symbols as indicated hereinabove.

The generalized embodiments of the Internet Access System of the present invention shown in FIGS. 1B(1) through 1B(4) and described above can be realized in a variety of ways using different types of enabling technology and system configurations tailored to the particular applications at hand. Three different particular embodiments of the Internet Access System will now be described below in detail with reference to FIGS. 1, 2 and 3.

First Preferred Embodiment of the Internet Access System Hereof

As illustrated in FIG. 1, the first preferred (particular) embodiment of the Internet Access System hereof 3 is realized in the form of a desktop computer system 6. As shown, the desktop computer system consists of a video monitor 6A, a processor 6B, keyboard 6C, mouse 6C, and Postcript® laser printer 35, and is connected to the Internet by way of an ISP 4. The computer system 6 has a GUI-based web browser program and a hand-held, wireless laser scanning bar code symbol reading system 7 which is connected to the communication port of this host system in a conventional manner. In the preferred embodiment, wireless bar code symbol reading system 7 comprises a hand-supportable laser scanning bar code symbol reading device 7A and a base unit 7B which receives RF signals transmitted from device 7A upon the successful reading of each bar code symbol thereby; the base unit 7B produces an acoustical acknowledgement signal in response to each such successful read. System 7 can be realized by any one of the (i) wireless bar code symbol reading systems disclosed in copending application Ser. No. 08/292,237 filed Aug. 17, 1994, or (ii) tethered bar code symbol reading systems disclosed in copending application Ser. Nos. 08/476,069 and 08/660,643, each said application being incorporated herein by reference.

While the operation of programmed bar code symbol reader 7 will differ slightly depending on which generalized Internet Access Method is used, the functions which it carries out will be generally the same, namely: to read a bar code symbol 8 that is encoded with either the URL or DN/PN of an information resource (e.g., Web-site) to be accessed by the Internet Access System; and produce symbol character data representative of the URL or DN/PN character string for use by the Internet browser program of its associated Internet Terminal. As used hereinafter, these special types of encoded bar code symbols shall be generally referred to as "URL-encoded bar code symbols", regardless of whether the complete URL or only a portion thereof (e.g., DN or DN/PN) is encoded within the bar code symbol structure.

In the case of where either the first, second or third generalized Internet access method described above is employed, the Internet Terminal (realized by desktop computer system 6) can provide Internet access support by running any conventional GUI-based Internet browser program, such as the Navigator® from Netscape or the Internet Explorer® from Microsoft.

In the case of where the fourth generalized Internet access method of FIG. 1B(4) is used, conventional browser programs of the type mentioned above must be provided with a Plug-in Module (e.g., browser subprogram) that can be readily written and installed within the browser program. The function of such a Plug-In Module is to: (i) automatically read scanned-URL information that is stored within an addressed data buffer at the I/O port of the client computer platform 6 (supporting the Internet Terminal); (ii) automatically write the URL information (in an appropriate format) to the data buffer assigned to the "Goto" window 40A of the Internet browser display screen 40 (shown in FIG. 4); and then (iii) automatically initiate HTTP over the Internet to connect to the associated Internet Server and access and display the information resource located at the entered URL. In such embodiments, it is preferred that each Internet Access System has a preloaded Internet browser program provided with the above-described Plug-In Module, or the functionalities provided thereby. It is understood, however, that in some instances it may be desirable to distribute or down-load the browser program and plug-in module to client computer systems from an Internet-based Information Server on the WWW using the well known file transmission protocol (FTP). In this way, conventional client computer systems can be easily converted into Internet Access Systems according to the present invention.

In the preferred embodiments of the invention, the bar code symbol reading system 7 is a laser scanning bar code symbol reader (e.g., a Metrologic Scanner MS951-48 with keyboard wedge) which is connected to the data-input port of the client computer platform 6. When used to read a URL-encoded bar code symbol, the URL is automatically entered as input into the "Goto" window of the Internet browser program, and, by way of HTTP, the particular information resource corresponding to the URL is automatically accessed by the Internet Access System for display on visual display terminal 6A in a manner well known in the art.

As mentioned hereinabove, each URL-encoded bar code symbol of the present invention can be either a linear (1-D) or 2-D bar code symbol structure of virtually any symbology that allows for the encoding of the (ASCII-type) information contained within a URL-type information structure, the syntax of which is well known in the art. In the preferred embodiment, the URL-encoded bar code symbol 8 is realized as a truncated-type bar code symbol constructed using any one of the following bar code symbologies: Code 128; full ASCII character set of Code 39; and Code 93. Preferably, each such bar code symbol is printed above, below or alongside each Web-site URL 14 or its listing in a Web-site guide or directory. Method and apparatus for composing and printing such bar code symbol lists and menus will be described in greater detail hereinafter. While the URL-encoded bar code symbol can be of any length, practical considerations will typically dictate which encoding technique should be used in any particular application. Notably, the advantage of using the truncated bar code symbol structure is that the height of the bars and spaces is relatively short in relation to the length of the bar code, thus allowing the URL-encoded truncated symbol 8 to be easily printed with each Web-site listing printed on crowded pages of printed Web-site guides and catalogues, as illustrated in FIG. 1A.

In accordance with the present invention, Web-site listings and menus, in which URL-encoded bar code symbols may be printed, include various types of printed guides, directories or publications which digest, catalogue, organize or otherwise list WWW sites or information resources that exist on Web-site Servers throughout the Internet. Examples of such printed Web-site publications include, for example: the "WWW Yellow Pages" (1996) published by the New Riders Publishers, Inc.; "PC NOVICE GUIDE TO THE WEB: How to find anything on the Web" (1996) published by Peed Corporation; "Cybersurfer", published by Starlog Group, Inc.; "Internet Underground", published by Ziff-Davis; "Internet User", published by Ziff-Davis; "Internet World", published by Mecklermedia; "The Net", published by Imagine Publishing; "Net Guide", published by CMP Media; "Online Access", published by Red Flash Internet; "The Web", published by International Data Group; "Websight", published by New Media, Inc.; "Yahoo Internet Life", published by Ziff-Davis and Yahoo; WebTV Guides; or any other printed publication that one may desire to use to look up an information resource (e.g., Web-site) of interest for access and exploration.

Figure 1A:
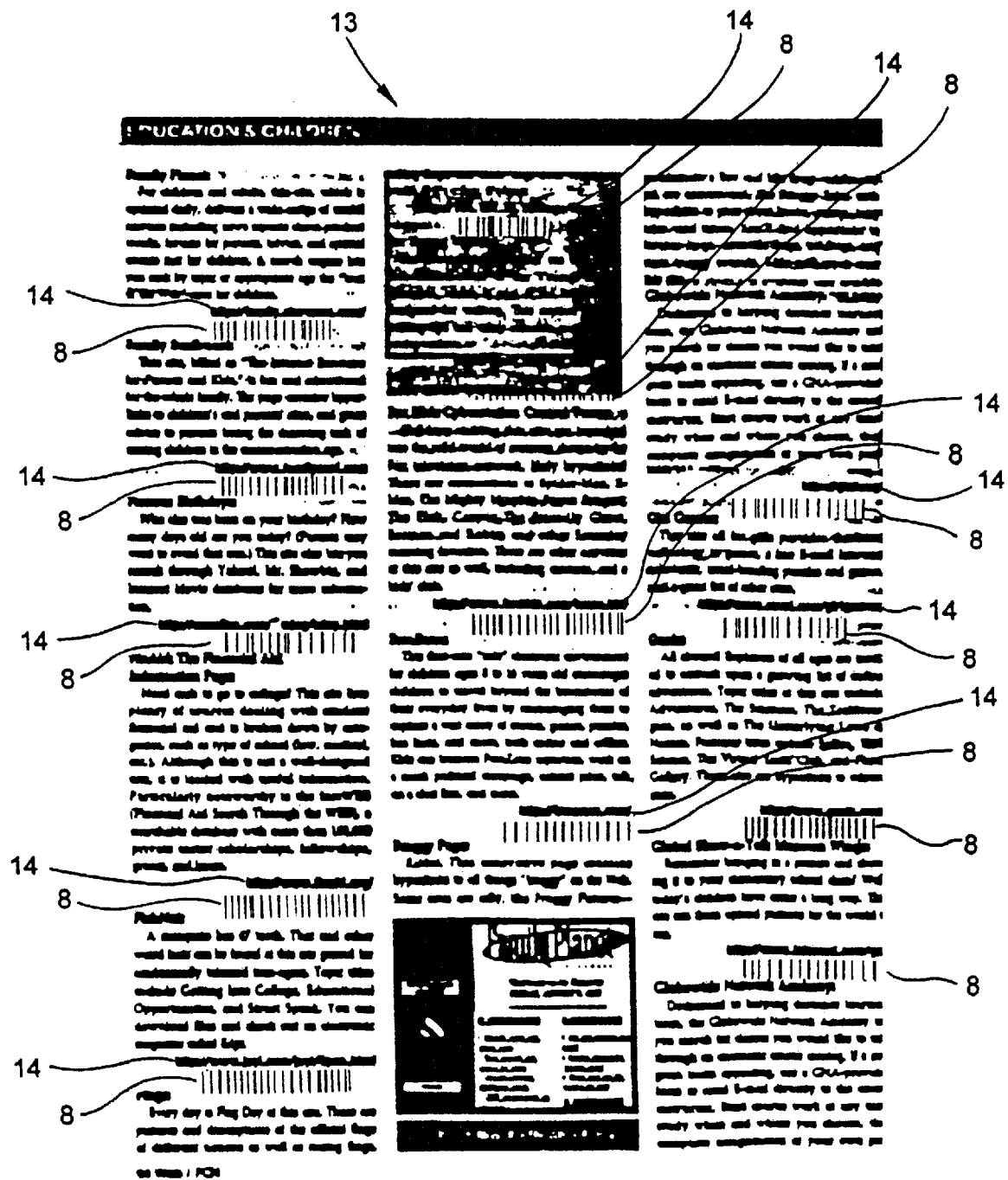
FIG. 1A is a schematic representation of a single sheet or page of the Web-site Directory of the present invention, showing several URL-encoded (truncated) bar code symbols printed thereon along with their corresponding human-readable URLs and content descriptions.

As shown in FIGS. 1 and 1A, the programmed bar code symbol scanner 7 of the Internet Access System of the first preferred embodiment is particularly designed so that closely nested Web-site listings on a single page can be read without inadvertently reading undesired URL-encoded bar code symbols. This added scanning control feature is achieved in the bar code symbol reader of FIG. 1 by providing the automatic laser scanning bar code symbol reader 7A with an optically-transparent scanning plate 9A supported from reader 7A by an optically transparent extension 9B. The scanning plate 9A has formed therein a sighting window (i.e., aperture) 10, through which a URL-encoded bar code symbol 8 is automatically scanned and read when such a printed symbol (on a substrate) is aligned with the sighting aperture. In this particular embodiment, the IR-based object detection field 11 of bar code symbol reader 7A extends just slightly beyond the sighting window 10 so that laser scanning by laser beam 12 is automatically initiated only when an object (e.g., Web-site guide) 13 is placed up against the sighting window 10, as when the scanning plate is brought in contact with URL-encoded bar code symbol 8 associated with a particular Web-site listing, shown in FIG. 1A. The design and construction details associated with automatic bar code symbol reader 7A can be found in Applicant's prior U.S. application Ser. No. 08/292,237 filed Aug. 17, 1994, incorporated herein by reference. As shown in FIG. 1, this scanning device can be provided with a keypad 15 in a manner known in the art, for manually entering the characters of URLs, as needed or required.

As discussed above in connection with FIG. 1D(1), it may be desirable to encode the URL of a particular information resource within two or more moderate-length bar code symbols, instead of within a single long-length bar code symbol. This will allow the use of shorter length bar code symbols on printed menus and lists. In such applications, the primary (i.e., base) portion of the URL (e.g., "http://www.metrologic.com") identifying the location of the WWW Server can be encoded within a first bar code symbol, whereas the auxiliary (i.e., extension) portion of the URL (e.g., "/products/MS6720.html") indicating the location of the information resource (web pages) relative to the identified WWW Server can be encoded with a second bar code symbol. With this technique, access to such an Internet-based information resource can be achieved in a two-step process, namely: (1) scan the first bar code symbol to access the home page of the WWW Server located by "http://www.metrologic.com"; and (2) scan the second bar code symbol to access the information resource located by "Products/MS6720/.html". Preferably, the base (i.e. primary) and auxiliary segments of the URL would be printed below the first and second bar code symbols respectively, as shown in FIG. 1D(1). This composite bar code symbol structure can be used during the menu composition process of the present invention as described in detail hereinabove.

Second Preferred Embodiment of the Internet Access System Hereof

Figure 2:
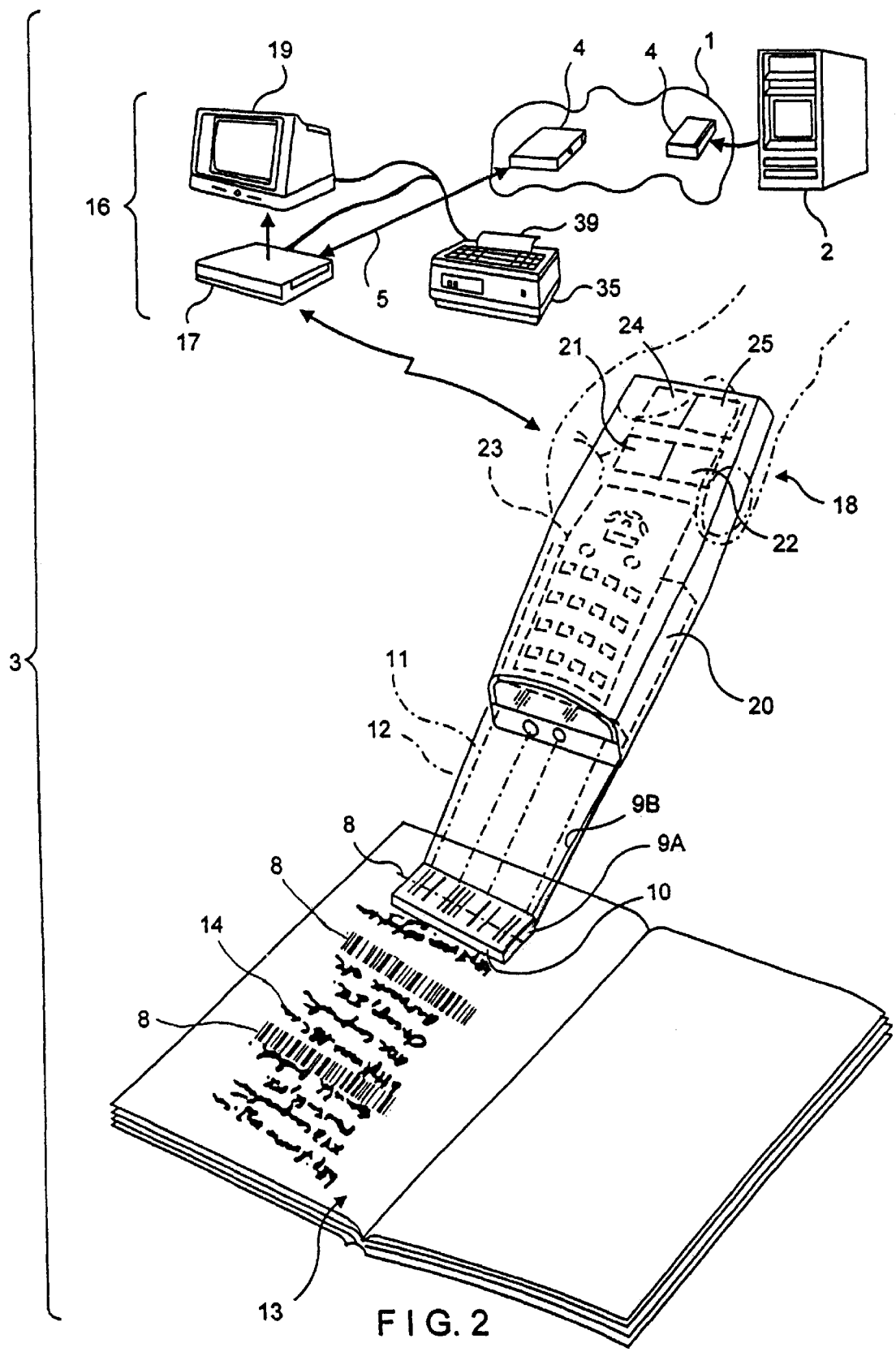
FIG. 2 is a schematic diagram of the second preferred embodiment of the present invention, in which the Internet Access System hereof is realized in the form of an interactive web-based television system which comprises a Terminal Unit shown connected to the Internet by way of an ISP and has portable Internet Navigation (i.e., surfing) Device having an IR-link to the Terminal Unit, and a bar code symbol scanner integrated therewith for automatically accessing Web-sites listed in a Web-site guide by simply scanning corresponding URL-encoded bar code symbols printed on the pages thereof.

As illustrated in FIG. 2, the second preferred embodiment of the Internet Access System hereof is realized in the form of an interactive web-based television system 16. Any of the generalized Internet access methods described hereinabove can be used to carry out this particular embodiment of the present invention.

As shown, interactive web-based television system 16 comprises an Internet Terminal Unit 17, a Remote Control Scanning Device 18 and a standard (NTSC or PAL) color television set 19. As shown, the Internet Terminal Unit 17 is connected to the Internet by way of an ISP 4 and includes means for supporting: (i) a GUI-based Internet browser program such as the Internet Navigator® from Netscape Communications or the Internet Explorer® from Microsoft, Inc.; and (ii) the TCP/IP networking protocol on the Internet. In the preferred embodiment, the Internet Terminal Unit 17 can be realized using any one of a number of commercially available Internet Terminal devices, such as, for example: the Mediamaster 9500™ Internet Terminal from Nokia, Inc.; the NetStation™ Internet Terminal from Acorn Computer; or the "Internet Digital Appliance" from Diba.

As shown in FIG. 2, the Remote Control Scanning Device 18 of the second preferred embodiment can be realized by integrating a miniature automatic bar code symbol reading module 20 into the wireless remote control device that is provided with the commercially available terminal unit that is used to practice this embodiment of the present invention. Preferably, automatic bar code symbol reading module 20 is similar to the device described in great detail in Applicant's copending application Ser. No. 08/292,237 supra. Such laser scanning engines, as they are called, are commercially available from Metrologic Instruments, Inc., of Blackwood, N.J., under the tradename ScanQuest®. The manner in which such a laser scanning engine can be integrated into any one of the remote control devices of the above-identified Internet Terminals, and thus provide the Remote Control Scanning Device 18, will be described below.

The Mediamaster 9500™ Internet Terminal from Nokia, Inc., the NetStation™ Internet Terminal from Acorn Computer, or the Internet Digital Appliance from Diba, are each provide with a wireless remote control device which includes a programmable microcontroller (i.e., microprocessor) operably connected to a system bus of one sort or another. The system subcomponents that are connected to this system bus structure include, for example: program memory realized in the form of EPROM 21; data storage memory realized in the form of RAM 22; a keypad 23, data storage registers and interface circuitry; an IR-based communication circuit and interface circuitry 24; and a power supply and power distribution circuitry 25. In such commercial products, no visual display device (e.g., LCD panel) is provided, as all display functions are provided on the television screen using an on-screen display format well known in the art. Integration of an automatic ScanQuest® Laser Scanning Module (Model No. IS4120) into the system architecture of such wireless remote control devices can be achieved by adding additional data registers to the system bus, and connecting the data output port of the scanner to such registers in a conventional manner. Additional control logic will have to be provided by the microcontroller in to provide scan data from the scanner to have priority over data entered manually into the system. All such modifications are well Known within the ordinary skill in the art.

As shown in FIG. 2, Remote Control Scanning Device 18 has an optically-transparent scanning plate 9A supported by an optically transparent extension 9B. The scanning plate 9A has formed therein a sighting window (i.e., aperture) 10, through which a URL-encoded bar code symbol 8 is automatically scanned and read when such a printed symbol (on a substrate) is aligned with the sighting aperture. The IR-based object detection field 11 extends just slightly beyond the sighting window 10 so that the laser scanning beam 12 is automatically initiated only when an object (e.g., Web guide) 13 is placed up against the sighting window 10, as when the scanning plate 10 is brought in contact with URL-encoded bar code symbol 8 associated with a particular Web-site listing, shown in FIG. 2. During operation, the Remote Control Scanning Device 18 is used to read URL-encoded bar code symbols 8 printed on Web-site GuideBook 13 in order to connect to the corresponding Web-sites thereof.

While any standard (NTSC or PAL) color television set can be used in connection with the Internet Terminal 17 to display graphical and audio information content associated with any particular Web-site accessed by the system, it is preferred that a higher-resolution (VGA or SVGA) computer monitor is used in connection therewith to display high resolution graphics.

Third Preferred Embodiment of the Internet Access System Hereof

Figure 3:
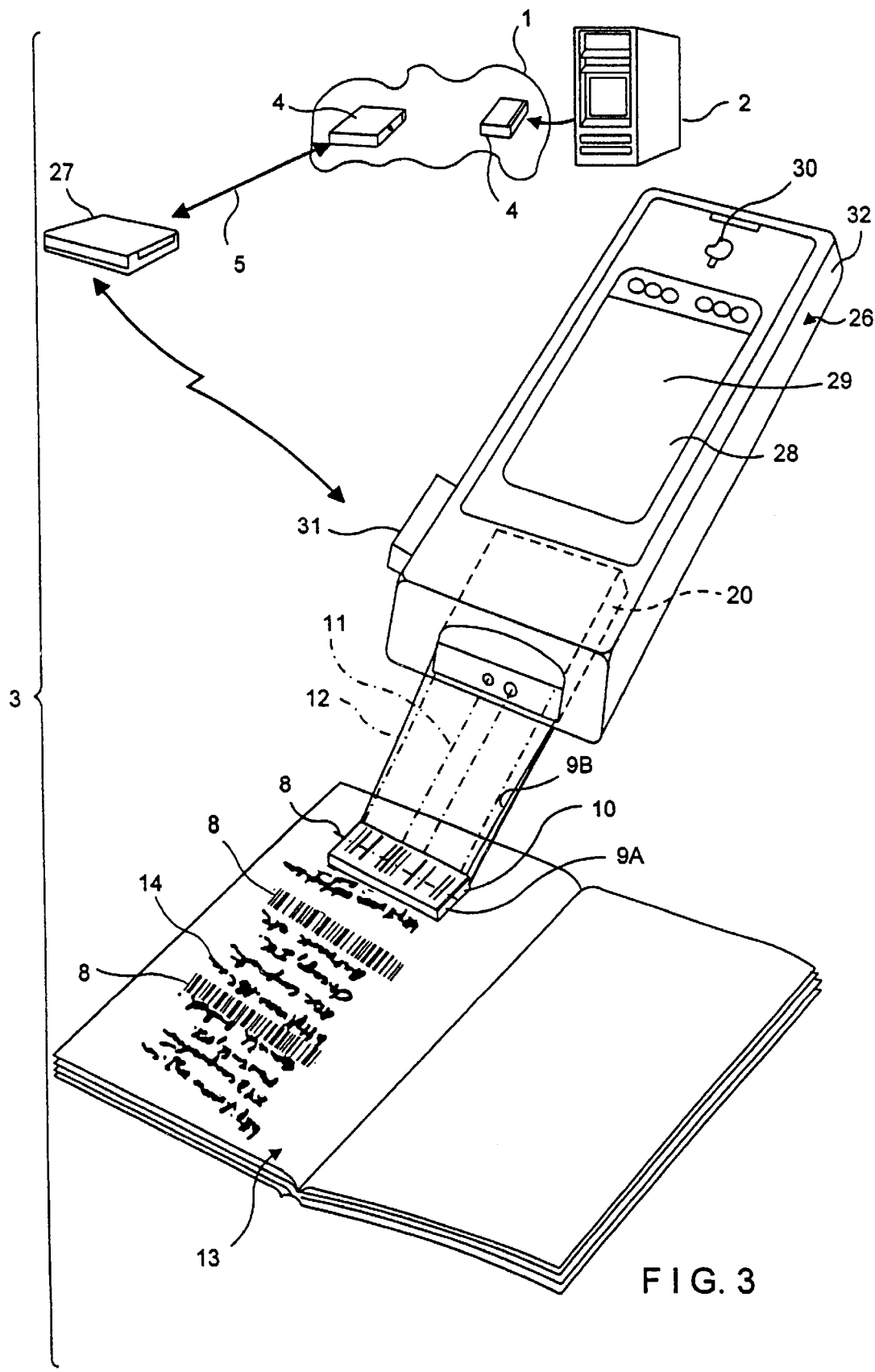
FIG. 3 is a schematic diagram of the third preferred embodiment of the present invention, in which the Internet Access System hereof is realized in the form of a hand-held Scanner Terminal shown connected to the Internet by way of a wireless link to an ISP, and having an integrated GUI-based web browser program, display panel, keypad, and programmed bar code symbol scanner for automatically surfing to Web-sites listed in a Web-site guide by simply scanning corresponding URL-encoded bar code symbols printed on the pages thereof.

As shown in FIG. 3, the third preferred embodiment of the Internet Access System hereof is realized in the form of a hand-held Integrated Scanning Terminal 26. Any of the generalized Internet access methods described herein can be used to carry out this particular embodiment of the present invention. The Internet Scanner Terminal 26 is shown connected to an ISP 4 by way of a radio-base station 27 and wireless link 5. The hand-held Internet Scanning Terminal 26 has an integrated GUI-based web browser program, display panel 28, touch-screen type keypad 29, and programmed bar code symbol scanner 20. The function of bar code symbol scanner 20 is to read a bar code symbol 8 that is encoded with the URL of a Web-site to be accessed by the Internet Access System, and produce symbol character data representative thereof.

In the illustrative embodiment, the Internet Scanner Terminal 26 is realized as a transportable computer, such as the Newton® Model 130 Messagepad 30 from Apple Computer, Inc. of Cupertino, Calif. This device is provided with NetHopper™ brand Internet Access Software from which supports the TCP/IP networking protocol within the Newton MessagePad. The Newton Messagepad is also equipped with a Motorola PCMICA-based modem card 31 having a RF transceiver for establishing a wireless digital communication link with either (i) a cellular base station, or (ii) one or more satellite-base stations (27) connected to the Internet by way of an ISP 4 in a manner well known in the global information networking art. While it is understood that, in some instances, it may be desirable to connect a pen or wand device to the serial port of the Newton MessagePad to provide bar code symbol reading capabilities thereto, it is generally preferred that automatic laser scanning engine 20 (e.g., Metrologic ScanQuest® Laser Scanning Module Model No. IS4120) be interfaced with the serial communications port of the Newton MessagePad so as to realize the Internet Access System of the third preferred embodiment hereof.

As shown in FIG. 3, the entire Newton MessagePad, ScanQuest® Laser Scanning Module 20 and auxiliary battery supply (not shown) are completely housed within a rubberized shock-proof housing 32, in order to provide a hand-supportable unitary device. The rubberized housing is provided with a scanning aperture 10 realized within an optically transparent scanning plate 9B supported by extension 9A. The function of the scanning aperture 10 is to allow the projected laser beam 12 to sweep across a URL-encoded bar code symbol 8 located within the sighting window 10 of optically-transparent scanning plate 9B, once the object (e.g., Web-site guide) 13 is detected by the object detection field 11.

In each of the three particular embodiments of the Internet Access System described above, the bar code symbol scanner can be replaced by a programmed optical character reader realized using, for example, the automatic holographic laser scanning technology disclosed in great detail in Applicant's copending application Ser. No. 08/573,949 filed Dec, 18, 1995, incorporated herein by reference. The function of the programmed optical character reader is to allow the Internet Access Terminal to access any desired Internet-based information resource by optically scanning the alphanumeric character string comprising the URL thereof, and provide the same as output to the "Goto" Window of the GUI-based Internet browser program thereof. In such alternative embodiments, the function of the optical character reader (i.e., character reading module) is to read the ASCII characters comprising the URL (and other encoded information) 14 printed on an object or article such as a Web-site guide or like publication, avoiding the need for manual key entry operations.

Subsystem For Composing and Printing URL-encoded Bar Code Lists and Menus

Having described various illustrative embodiments of the Internet Access System of the present invention, it is appropriate at this juncture to describe a system and method for composing, transmitting and printing lists (e.g., menus) of URL-encoded bar code symbols in various ways according to the principles of the present invention.

Figure 4:
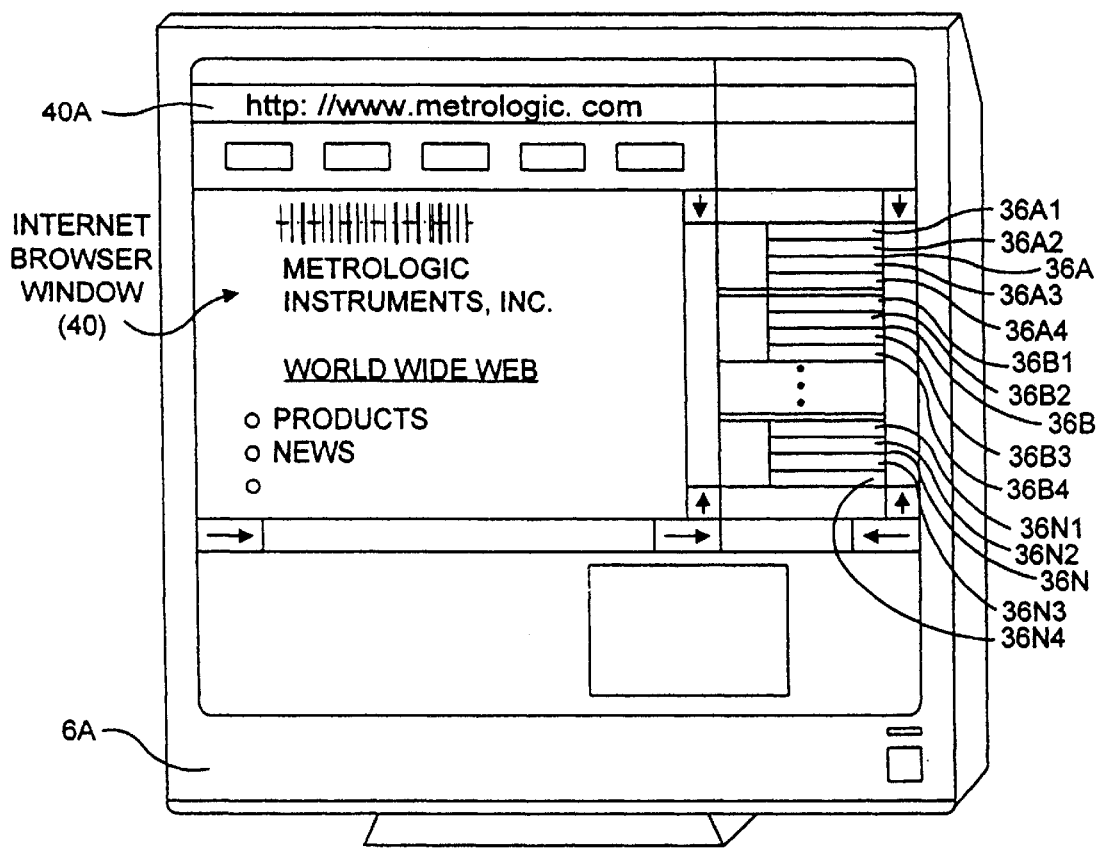
FIG. 4 is a schematic representation of an exemplary window of an Internet browser program running on the system of FIG. 1, and also an exemplary window for the URL-menu composition/Printing Module plug-in of the present invention allowing its user to compose, transmit and print URL-encoded menus according to the principles of the present invention.
Figure 5:
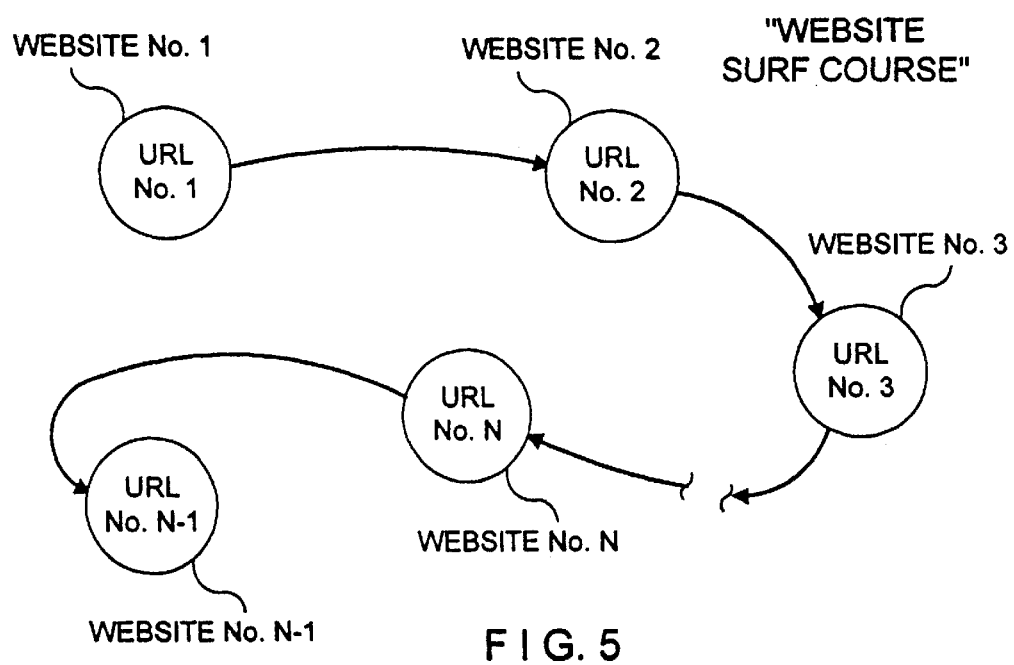
FIG. 5 is a schematic representation of an exemplary sequence of Web-sites along a Web-site "surf course" that are to be digested within a URL-encoded menu composed and printed according to the present invention.

As shown in FIG. 4, the Web-linked client computer workstation 6 of FIG. 1 has a graphical user interface (GUI) and an Internet browser (or communicator) program that has an additional plug-in type module (i.e., subprogram) composing, transmitting and printing lists and menus of URL-encoded bar code symbols and information elements associated therewith (hereinafter the "Composition/Printing Module"). Composition/Printing Module can be realized as a plug-in module to the Netscape Navigator browser program, the Microsoft Explorer browser program, or other Internet communication program presently available or developed in the years ahead, using programming techniques and languages (e.g., Java) known in the art. The purpose of this Module is to cooperate with the Internet browser program and support the user during the composition and editing of lists (i.e., menus) of URL-encoded bar code symbols and information fields related thereto in accordance with the principles of the present invention, and then enable such lists and menus to be printed locally using printer 35 shown in FIG. 1, or transmitted to a remotely located system for printing. As such, the Module is provided with an editing mode to edit information entered into information fields associated with any particular bar code list or menu of the present invention. Composition and printing functionalities and enabling programming code embodied within the Module or browser program of the present invention can be found in Bar Code Pro® brand Bar Code Symbol Composing and Printing software sold by SYNEX, of Brooklyn, N.Y.; and Zooworks Research Personal (1.0) web-indexing software from Hitachi Computer Products (America) Inc, of Santa Clara, Calif. (URL:http://hitachisoft.com/research). Optionally, the Module and/or browser program can also embody the functionalities provided by FilePro® bar code database software, also available from SYNEX.

As shown in FIG. 4, the Composition/Printing Module has an associated "display window" 36 which can be opened in a conventional manner to allow the user to easily compile bar code symbol menus during operation of an Internet browser program. In the illustrative embodiment shown in FIG. 4, the bar code menu display window 36 is shown to comprise information display fields 36A, 36D, 36N associated with three exemplary information resources on the WWW that have been listed within a bar code menu in composition. As shown, this listing of information display fields graphically present on display monitor 6A: a set of human-readable URLs corresponding to a set or course of information serving Web-sites schematically represented in FIG. 5, 36A1, 36B1, 36N1; a set of titles assigned to the URLs (which may be directed to the owner of the site, the information content contained therein, etc.) 36A2, 36B2, 36N2; a set of brief descriptions of content (DOC) served at the Web-sites indicated by reference numerals 36A3, 36B3, 36N3; and date or dates the set of Web-sites were last visited by the composer, indicated by reference numerals 36A4, 36B4, 36N4.

Figure 6A:
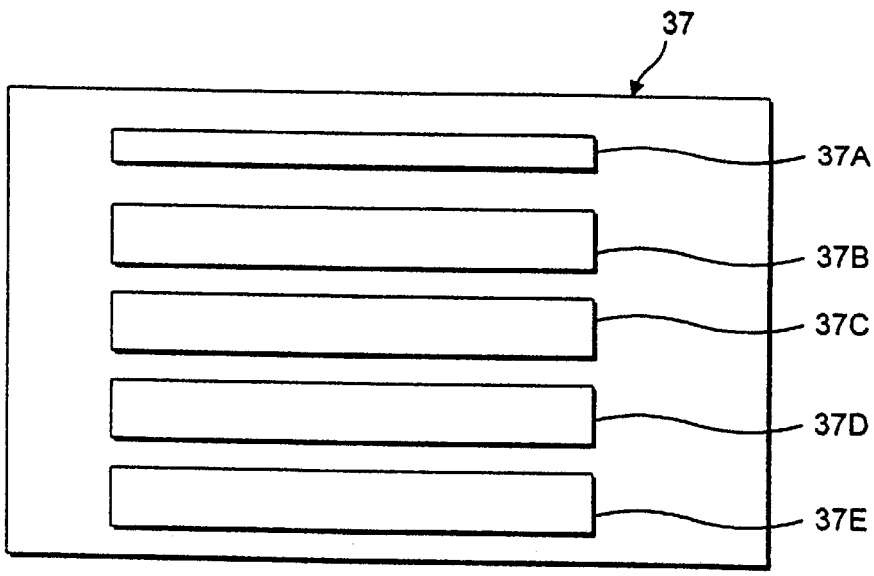
FIG. 6A is a schematic representation of an exemplary portion of an information storage structure for a URL-encoded Menu, showing the various information storage fields contained therein.

In FIG. 6A, an information storage structure 37 is shown for storing the information elements associated with a given URL information block in a bar code menu composed using the Composing/Printing Module during on-line Internet surfing sessions or while off-line. As shown, each information storage structure 37 comprises the following information fields for a given information resource: URL Field 37A for storing information descriptive of the URL of Web-site location (e.g., information resource) associated therewith; URL-Encoded Bar Code field 37B for storing information descriptive of the URL-Encoded bar code associated with the URL of the information resource; Title Field 37C for storing information descriptive of the title assigned to the corresponding information resource; Content Description Field 37D for storing information descriptive of the content of the information resource; and Data Field 37E for storing information descriptive of the date the composer or his agent last visited the information resource prior to composition of the bar code symbol menu.

Figure 6B:
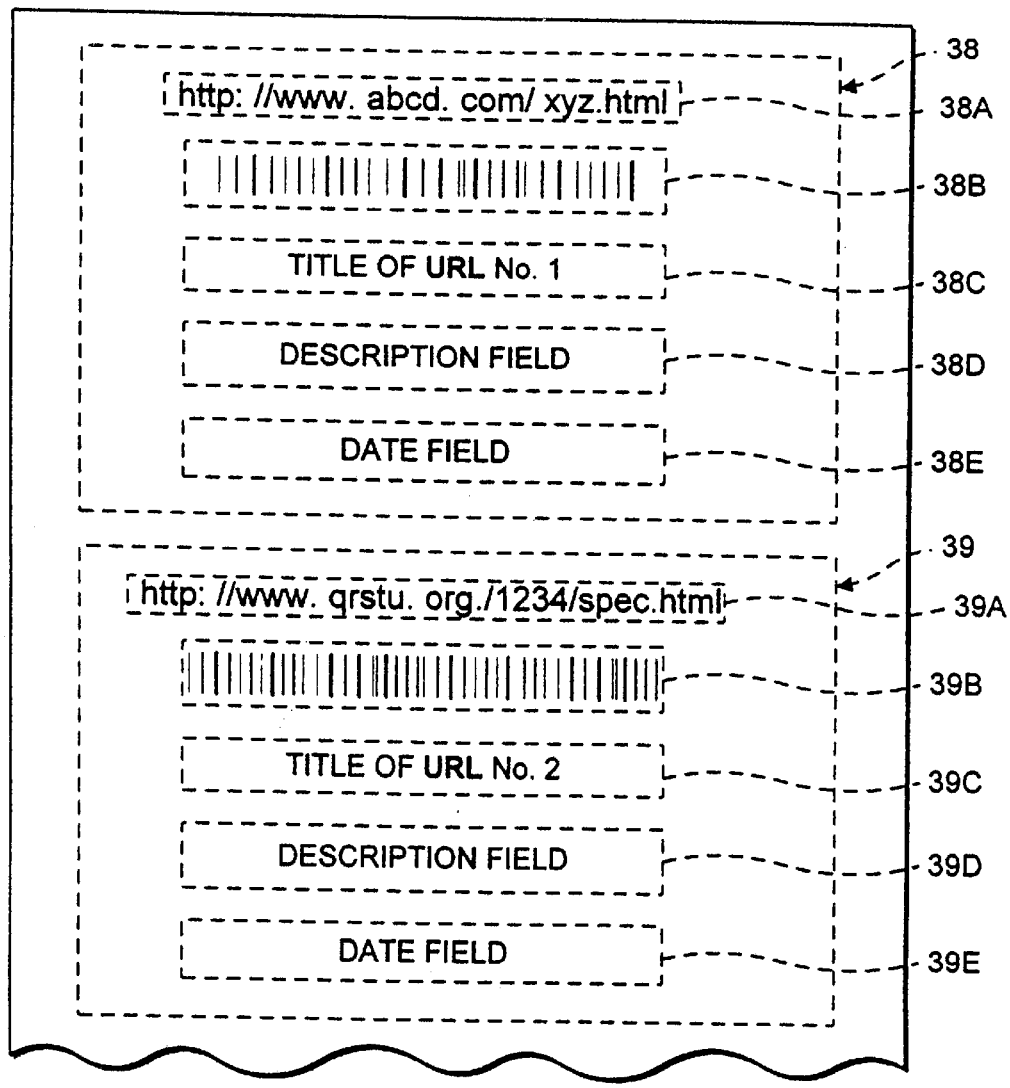
FIG. 6B is a schematic representation of an exemplary section of the URL-encoded Menu of FIG. 6A, showing the various information display fields contained therein.

In FIG. 6B, an exemplary section of a printed URL-encoded menu is shown. As shown, each printed block of information 38 associated with a particular Web-site (or Internet information resource) has the following information display fields: an information display field for graphically displaying the corresponding URL, indicated by reference numeral 38A; an information display field for the URL-encoded bar code symbol, indicated by reference numeral 38B; an information display field for graphically displaying the Title assigned to Web-site location referenced by the corresponding URL, indicated by reference numeral 38C; and an information display field for graphically displaying the description of the information content served at the Web-site location referenced by the corresponding URL, indicated by reference numeral 38D; and an information display field for graphically displaying the date on which the composer or his agent list visited the information resource, indicated by reference numeral 38E. In general, a number of such information display blocks can be printed on a single sheet of print media (e.g., paper, plastic, etc.) 39. The particular display layout for information display block will depend on the application at hand and typically will vary from embodiment to embodiment of the present invention. For example, in some embodiments, the printed information display blocks will be arranged in a single column down each printed sheet. In other embodiments, the printed information display blocks will be arranged in a two or more rows or columns. In yet other embodiments, the layout of such information display blocks may be of random or quasi-random structure.

Figure 7A:
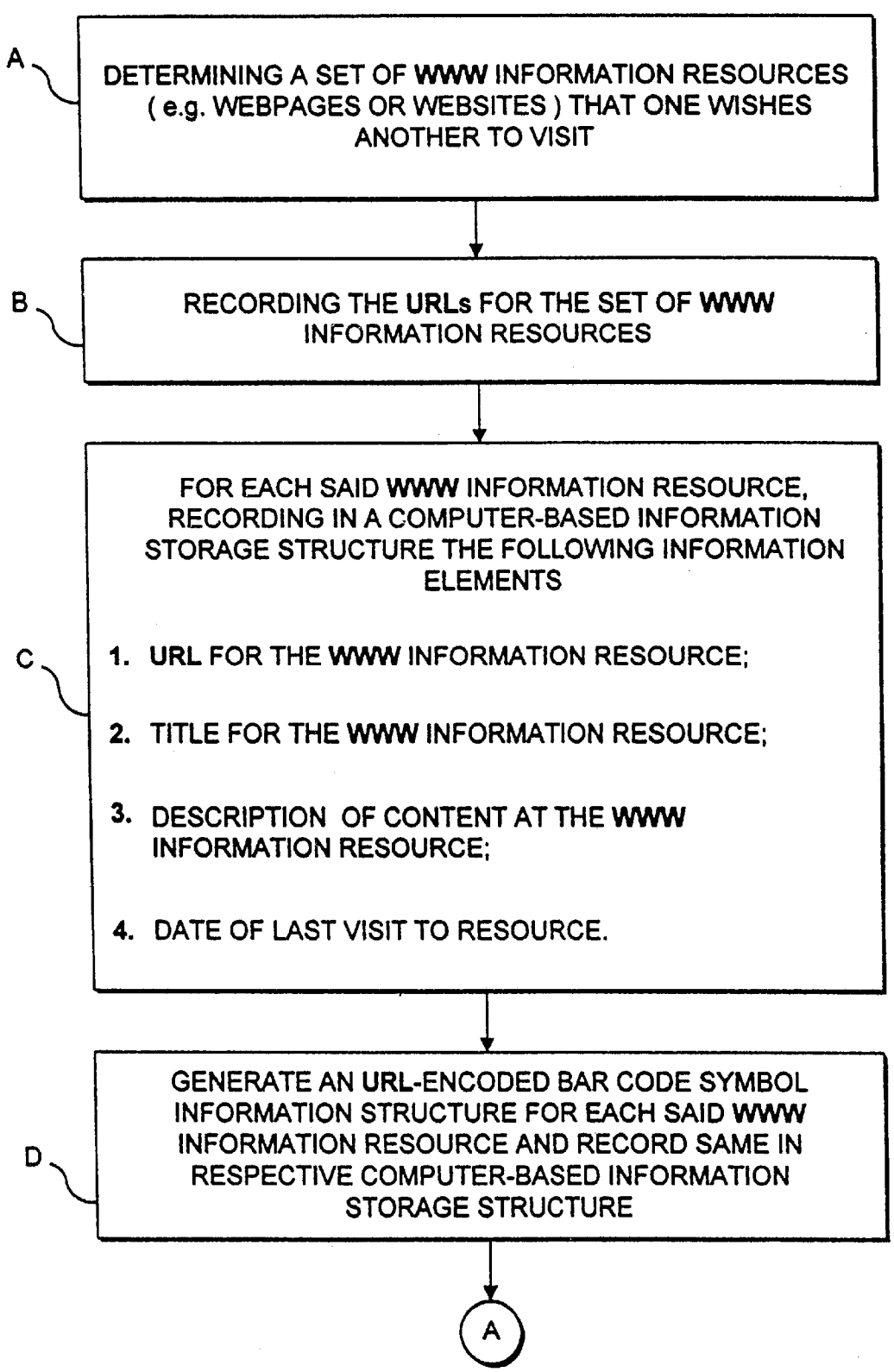
FIGS. 7A and 7B provide a flow chart setting forth the steps carried out during the execution of the illustrative embodiment of the Bar Code Menu composition/Printing Module of the present invention.
Figure 7B:
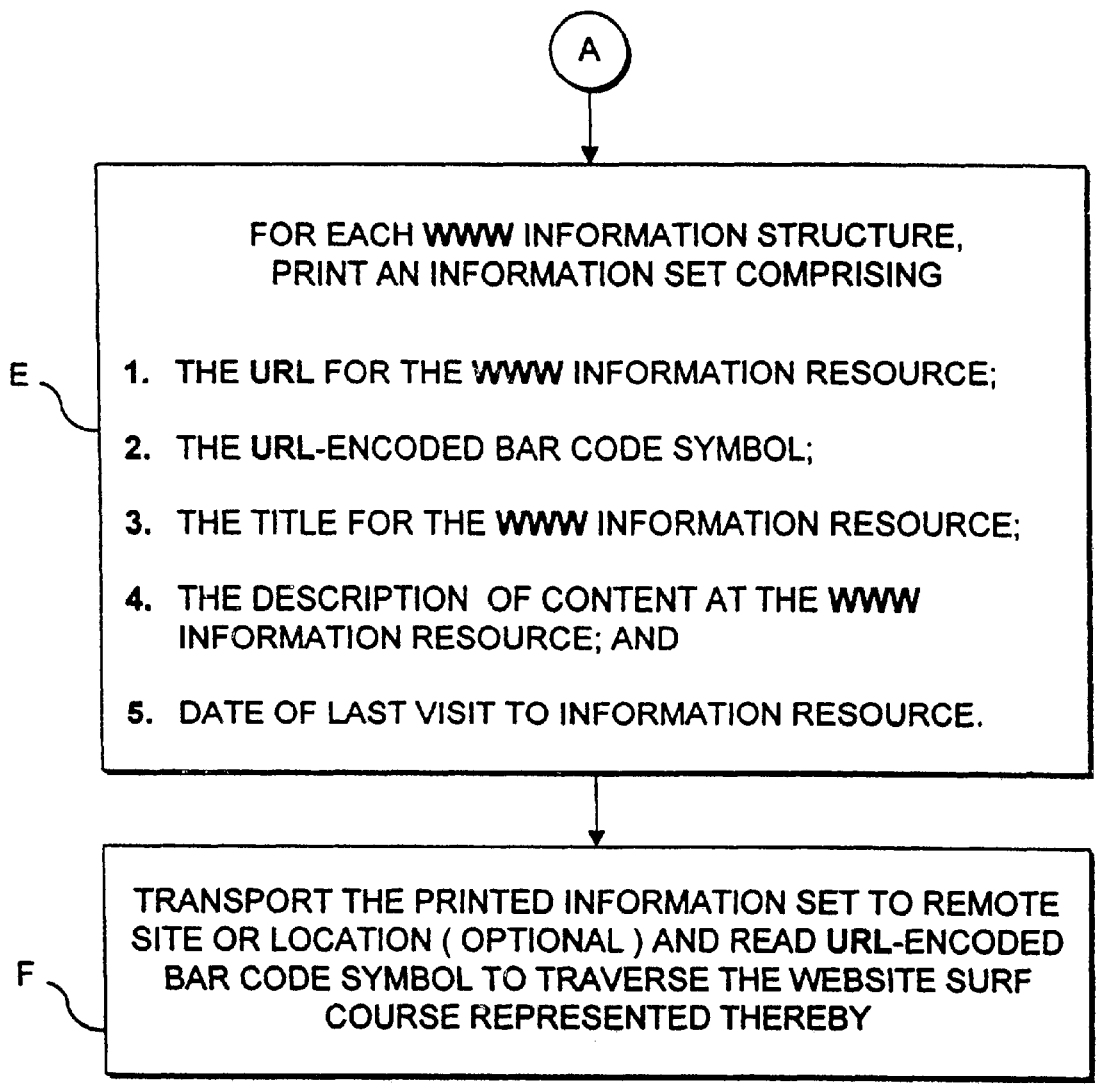

FIGS. 7A and 7B set forth a high-level flow chart describing the steps carried out during composition, transmission and printing of URL-encoded bar codes according to the method of the present invention. In the illustrative embodiment, this method is carried out while using a GUI-based Internet browser program is on-line, with the above-described Composition/Printing Plug-In Module installed so that the user is enabled to compose, transmit and print bar code menus of the type schematically illustrated in FIGS. 6A and 6B. It is understood, however that the method can also be carried out while the Internet browser program is "off-line". Alternatively, the functionalities of the Composition/Printing Module (to be described in greater detail below) can be realized in a separate program designed to run "in the background" of the operating system (OS) while the Internet browser program is running, or run by itself when the Internet browser program is not running.

As indicated in Block A of FIG. 7A, the method involves first determining completely or partially, a set or information resources on the Internet (e.g., WWW or FTP Servers) that the composer wishes he or another to visit in the immediate or future. Typically, although not always, the Internet browser program with the installed composition/Printing Module hereof will be up and running during the composition process, generally represented at Blocks A through D in FIG. 7A. This list or ordered set of information sources identified by the composer may be thematically related by a particular subject or topic which the composer may have in mind before, during or after the composition process. The list may be, however, simply a collection of information resources on the WWW, for example, which the composer would like to catalog in the form of a bar code menu so that others may easily visit the catalogued collection of Web-sites by simply reading URL-encoded bar code symbols from a printed menu, as described hereinabove. In the field of education, for example, such bar code menus could be composed by teachers or professors and distributed to their students so that they can visit the catalogued Web-sites either inside or outside the classroom or lecture hall. Writers and/or editors of books, journals and magazines could print URL-encoded bar code symbols in the back of their publications (corresponding to references cited in their published publications). Brochures and manuals for products and/or services could contain lists of URL-encoded bar code symbols that point to information resources on the Internet, which contain information relating to such products and/or services. Printed (i.e. hard-copy) Web-site magazines, catalogues, directories and the like can be formatted with URL-encoded bar code symbols of the present invention, as illustrated in FIG. 1A and described above, to enable Internet access thereto by scanning such encoded bar code symbols.

As indicated at Block B in FIG. 7A, the composer employs the Internet browser program of the present invention to record the URLs for the set of information resources on the WWW. The URLs can be entered into their appropriate information recording fields, consecutively at a particular point in time, or over a period of time when the composer is surfing the WWW and determining which WWW information resources should be catalogued within the menu under composition.

As indicated at Block C, the composer records a number of information items in an information storage file as shown in FIG. 6A and displayed with the Internet browser screen 40 on the computer terminal shown in FIG. 4. For each WWW information resource, the composer is encouraged to enter the following information items: the URL for the WWW information resource; the Title assigned to the WWW information resource by the composer; and the description of the information content at the WWW information resource. Collectively, these related items of information are stored within the information storage structure of the file maintained by the CTP Module and they form an information block.

As indicated at Block D in FIG. 7A, after each information block is recorded for a particular WWW information resource, the Composition/Printing Module is used to automatically generate a URL-encoded bar code symbol information structure therefor and record this information in its respective information field within the information storage structure represented in FIG. 6. Once a list of URLs has been captured, indexed and recorded within the information storage structure underlying any particular bar code menu, the composer may then decide during the editing mode of the plug-in Module, exactly how the Web-site information blocks, shown in FIG. 6B, should be ordered for presentation to his or her audience upon printing.

As indicated in FIG. E of FIG. 7B, a composed bar code symbol menu as shown in FIG. 6B is printed out on a sheet of paper using conventional Postscript® printing equipment 35, illustrated in FIG. 1, for example. At this stage of the process, the following information items are printed out for each WWW information resource: the URL for the WWW information resource; the URL-encoded bar code symbol; the title assigned to the WWW information resource by the composer; the description of the WWW information resource; and the date on which the composer or his agent last visited the information resource. Expectedly, the display format for any printed information file according to the present invention will vary from embodiment to embodiment. Preferably, the Composition/Printing module installed within the Internet browser program hereof will be provided with a number of different display formats, from which the composer can easily choose to satisfy the requirements of the project and application at hand.

As indicated at Block F, the composer may optionally choose to transport by electronic data transmission or facsimile transmission, any composed bar code symbol menu according to the present invention. In such instances, the compiled information storage file (as shown in FIG. 6A) representing the composed menu can be electronically transmitted to a remote site, by e-mail, facsimile transmission, or other protocol available over the Internet, and thereafter printed out using appropriate print-driver software. This way the WWW information resources listed in the compiled information structure can be easily visited by reading the corresponding URL-encoded bar code symbols into the Internet browser program using a bar code scanner. Alternatively, the bar code menu can be printed out locally and then transmitted to a remote location by way of facsimile transmission for print out and subsequent use. When using this latter technique, however, careful consideration must be accorded to the resolution of the printed bar codes, as their resolution may be significantly reduced due to scanning facsimile transmission, and printing required by this latter technique. In such instances, it may be desirable to scale-up the bar codes during menu composition to compensate for expected resolution losses downstream.

The bar code menu composition/printing process of the present invention has been described above in connection with a commercially available GUI-based Internet Browser program that has been provided with a plug-in module that enables the menu composition, transmission and printing processes of the present invention. It is understood, however, that in alternative embodiments of the present invention an independent program may be written to carry out the interactive menu composition/transmission/printing process illustrated in FIGS. 7A and 7B. In such instances, the composition program could be designed to run in the background of the operating system while the composer is using the Internet browser program to explore Cyberspace and determine which Web-sites should be listed in the bar code menu in composition. Once a list of URLs has been captured and recorded within the information storage structure underlying any particular bar code menu, the composer may later, during the editing mode of the program, decide exactly how the Web-site information blocks, shown in FIG. 6A, should be ordered for presentation to his or her audience upon printing.

Having described the illustrative embodiments of the present invention, several modifications readily come to mind.

Instead of using a laser scanning module to construct the Internet Access Terminals of the present invention, as shown in FIGS. FIGS. 1, 2 and 3, one may use CCD-type bar code scanning engines (or modules) employing LEDs to illuminate bar code symbols in the scan field, and CCD-type linear or array devices for capturing images thereof for subsequent decode processing. Examples of CCD scanning modules that can be used to construct CCD-based Internet Access Terminals according to the present invention can be found in the following U.S. Pat. Nos.: 5,550,366; 5,354,977; 5,291,009; 5,484,994; 5,349,172; and 5,532,467; each being incorporated herein by reference in its entirety.

As mentioned above, the present invention contemplates using encoding URL (or DN/PN) information within 2-D bar code symbols as schematically illustrated in FIG. 1C(1). In such instances, one would provide a 2-D bar code symbol reading engine (or device) within each Internet Access System of the present invention so that to the URL information encoded within 2-D bar code symbols can be optically scanned and decoded using the appropriate 2-D bar code decoding algorithm. Examples of 2-D (laser scanning) bar code symbol reading devices that can be used to construct "2-D type" Internet Access Systems according to the principles of the present invention are disclosed in the following U.S. Pat. Nos.: 5,594,232; 5,523,552; 5,504,316; 5,414,250; 5,373,148; 5,319,181; each being incorporated herein by reference in its entirety. In other embodiments of the present invention, one may employ scanning modules capable of reading both 1-D and 2-D type bar code symbols.

In order to indicate that a particular printed publication or object bears a URL-encoded bar code symbol according to the present invention, and not a conventional bar code symbol (e.g., UPC Symbol), it may be advantageous to print the entire or primary portion of the encoded URL (e.g., http://www.metrologic.com) about the perimeters of the URL-encoded bar code symbol, in a similar way that UPC numbers are printed below UPC-type bar code symbols. This printing convention, once adopted, will help consumers determine which bar code symbols provide "Internet Access", in contrast with other types of bar code symbols.

In instances where the character string length of the URLs becomes long, particularly in connection with information resources that are stored in very-large Web-based database management systems (DBMS), it may be desirable to pre-encode the URLs (to shorten their character string length) prior to encoding the URL within the bar code symbology being employed.

In the illustrative embodiments of the present invention disclosure, the exemplary information resources have been indicated as being stored within WWW-based information servers (i.e. Web Servers), and thus, the character substring "http://www." has been included with the URL for each such information resource in accordance with the syntactical requirements of URL specification and HTTP. It is understood, however, that URL-encoded bar code symbols according to the present invention may also refer (i.e., point) to information resources stored on any type of Internet information server (e.g., a FTP information server) accessible through an Internet browser or communication program of an Internet Access System of the present invention.

The bar code-driven Internet Access System of the present invention can be applied in numerous ways to make life easier at home, in the office, and at school. For example, the present invention can be used to construct a Web-based Package Routing, Tracking and Delivery System shown in FIGS. 8 through 16 of the drawings.

Figure 8:
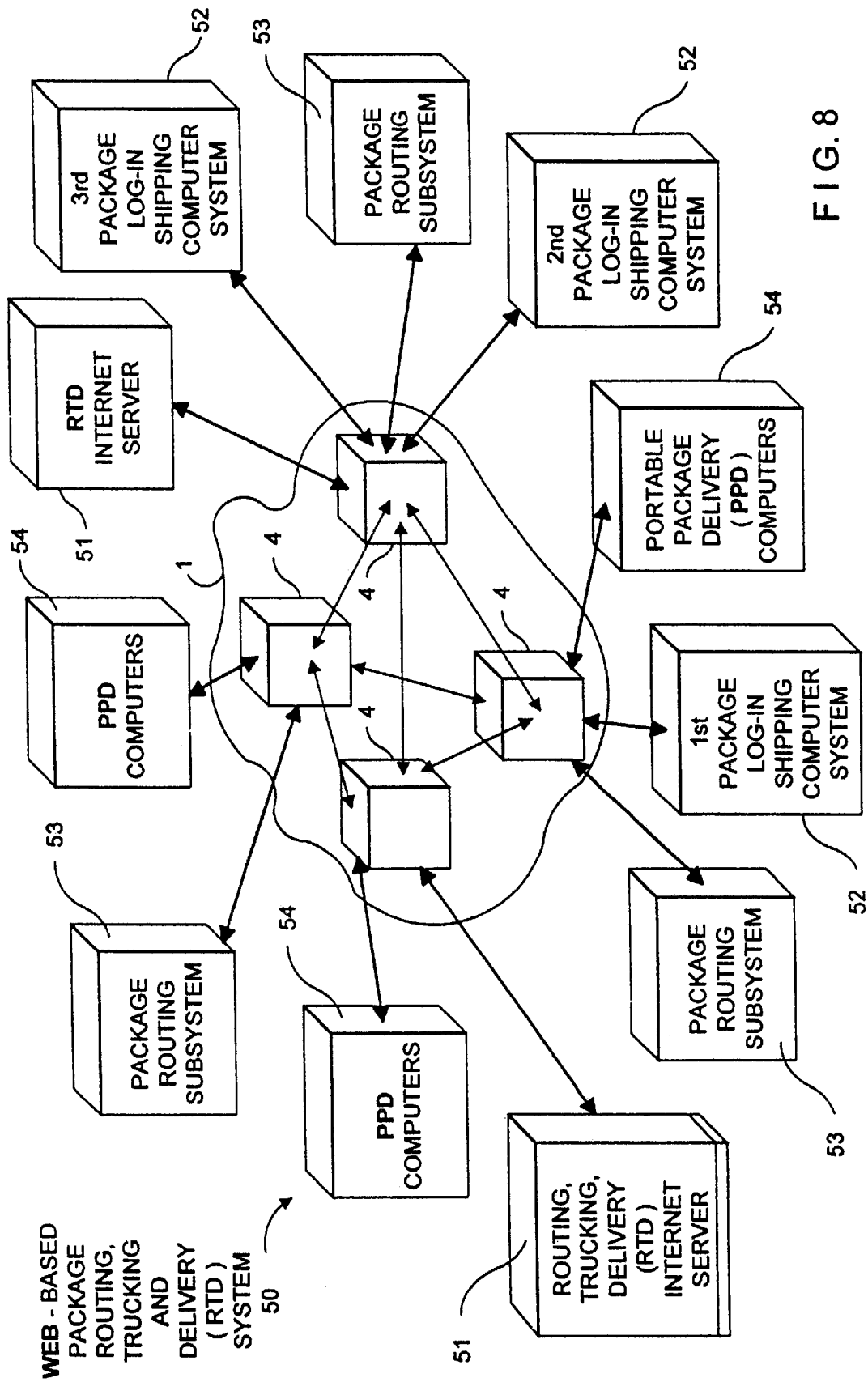
FIG. 8 is a schematic diagram of the Web-Based Package Routing, Tracking and Delivery (RTD) System of the Present Invention showing a plurality of RTD Internet Servers connected to the Internet infrastructure, a plurality of Package Routing Subsystems located at remote hub stations of the system and connected to the RTD Internet Servers by way of the Internet infrastructure, a plurality of Log-In Shipping Computer Subsystems located at product shipping locations throughout the world and connected to the RTD Internet Servers by way of the Internet infrastructure, and a plurality of Portable Package Delivery (PPD) Computer-Based Subsystems with wireless connection to the RTD Internet Servers.

Overview of the Web-based Package Routing,
Tracking and Delivery (RTD) System Hereof As shown in FIG. 8, the web-based package routing, tracking and delivery (RTD) system of illustrative embodiment generally indicated by reference number 50 comprises a plurality of system components, namely: globally-based digital telecommunications network (such as the Internet) 1 providing an infrastructure described hereinabove including ISPs, NSPs, routers, telecommunication lines and channels and the like; one or more data-synchronized Package Routing, Tracking, and Delivery (RTD) Internet Servers 51 connected to the Internet by way of the Internet infrastructure; one or more Package Log-In/Shipping (Computer-Based) Subsystems 52', 52" and 52'" (generically indicated as 52), located at different shipping locations throughout the world, and operably connected to the Internet by way of the Internet infrastructure; a plurality of Package Routing (Computer) Subsystems 53', 53", 53'" (generically indicated as 53) located at remote hub stations of the RTD system and connected to the RTD Internet Servers by way of the Internet infrastructure; and a plurality of Portable Package Delivery (PPD) Computer-Based Subsystems (e.g., integrated scanning terminals) 54', 54", 54'" (generically indicated as 54) in wireless digital communication with the RTD Internet Servers by way of the Internet infrastructure. Each of these subsystems will be described in greater detail below.

Thereafter, the operation of the RTD system of the present invention will be described.

The Package Log-In/Shipping Computer Subsystem

Figure 9:
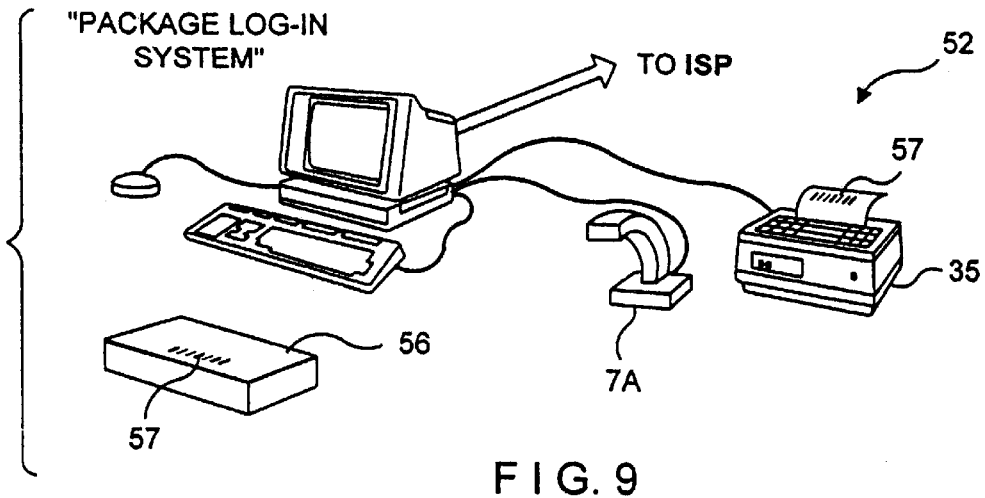
FIG. 9 is a schematic representation of a Package Log-in/Shipping Computer-Based Subsystem of the Web-based RTD System of the present invention.

As shown in FIG. 9, each Package Log-In/Shipping Subsystem 52 is realized as either a desktop or portable Internet Access Terminal of the present invention shown in FIGS. 1, 2, or 3 and described above. The function of the Package Log-In/Shipping Subsystem 52 is to log-in each package with a relational database management system (RDBMS) maintained within or behind the RTD Internet Server 51 of the system. As will be described in greater detail hereinafter, this log-in procedure involves: (1) accessing a RTD Internet Server 51 by reading a particular predesignated URL-encoded bar code symbol specifying its address on the Internet; (2) entering package-related information into the system by way of the Internet; (3) creating and printing a custom bar code symbol label encoded with the URL (and Zip-Code) and an address label bearing the name and address of the entity to whom the package is to be delivered; and (4) applying the bar code label and address to the package prior to shipping for carrying out routing, tracking and delivery functions.

The RTD Internet Server Subsystem

As shown in FIG. 11, each data-synchronized RTD Internet Server 51 of the illustrative is realized by, for example, a PowerMac 8550/200 Internet Server from Apple Computer, Inc., an Origin 200 Server from Silicon Graphics, Inc., or any other Internet server running: (1) HTTP server software (e.g., Netscape Enterprise Server software from Netscape Communications, Inc., or WebStar® Server software from StarNine, Inc.); (2) Common Gateway Interface (CGI) software (e.g., Tango from Everyware Development Corp.); (3) relational database management system (RDBMS) software (e.g., 4D Version 6.0 from ACI US, Inc.); and (4) website development software (e.g., PageMill from Adode, Inc.) for website design and creation. In a conventional manner, each Internet RTD Server is assigned a unique static IP address and a common domain name on the Internet's Domain Name System.

The RDBMS software (e.g., 4D Version 6.0 from ACI US, Inc.) is used to construct a RDBMS 55 within or at the back-end of each Internet RTD Server 51. As shown in FIG.

11B, the RDBMS 51 is used to maintain a hypermedia-type relational database containing package shipping, tracking and delivery related information. As shown in FIG. 11B, each database record (i.e., RTD information record) maintained for each package logged-into the system comprises a number of information fields, namely: a URL Field 55A, for storing the URL assigned to each package, at which a static information storage location resides on a web-page on the RTD Internet Server 51; a Package Identification Field 55B for storing a unique number assigned to each package being routed, tracked and delivered within the RTD system hereof; a Shipper Identification Number Field 55C for storing an identifying number assigned to each shipper authorized to ship packages within the RTD system; a Destination Information Field 55D for storing information describing the (initially, past and currently specified) destination(s) of the package; a Zip Code Information Field 55E for storing Zip Code information on the package destination; a Package Content Information Field 55F for storing information regarding the contents of the package; a Delivery Instructions Field 55G for storing delivery instructions (e.g., including graphical maps, audio-based delivery instructions, etc.) for use in delivering the package to its destination; a Date of Log-In Field 55H for storing the date the package is logged-in with the system; a Date of Shipping Field 55I for storing the date the package was shipped (or is expected to be shipped) within the system; a Date of Delivery Field 55J for storing the date the package was delivered (or is expected to be delivered) to its destination; a Package "Goto" Field 55K for storing information on the location of the package within the RTD system; a Time/Date of "Goto" Field 55L for storing information on the time and date of the tracked location of the package within the RTD system; a Shipping Route Field 55M for storing information specifying the planned route of travel assigned to end logged-in package; and Other Information Fields 55N, 55O and 55P for storing various items of information relating to the package description, shipping, tracking and delivery.

In order that each subsystem 52, 53 and 54 can connect with RTD Server 51 and access the RTD information record associated with any package logged-in with the system, the following measures are taken: (1) each logged-in package 56 is labelled with a URL-encoded bar code symbol 57 having an information field structure shown in FIG. 12, as well as a conventional name/address label; and (2) the URL encoded within the bar code symbol is used to specify the location of an information storage field 58 represented on a statically-defined HTML-encoded information field 59 on a web-page stored on the RTD Information Server 51 and served to client subsystems by HTTP Server 60. The size of each Web-based information storage field 58 is sufficient to store ASCII information describing the unique product identification number assigned to the corresponding product being routed and tracked within the system. The RTD information record in the RDBMS 55 associated with any particular package is linked to the URL by the product identification number stored at the information field specified by the URL. The CGI 61 realized aboard RTD Server 51 (1) translates the product identification number (stored on Web-page 59 at URL 58) into an SQL-type request for the information elements associated with the corresponding RTD information record stored in the RDBMS 55, and (2) converts such retrieved information elements into an HTML-encoded web-page conveniently formatted for display on the display screen of the requesting client system 52, 53 and/or 54. A Web-page composition program, such as Adobe® PageMill, BBEdit®, or any other HTML editing program, can be used to create HTLM-encoded pages 59 for representing statically-defined information storage locations 58 specified by URLs that are ultimately assigned to package identification numbers used within the RTD system. Such Web-paged based information structures can be accessed: (1) using the Package Log-In/Shipping Computer 52 during and after package log-in, (2) using the PPD Computer 54 during package delivery, and/or (3) using any Internet browser program authorized accessed to information fields within the RDBMS of the RTD Internet Server 51.

The Package Routing Subsystem

Figure 13:
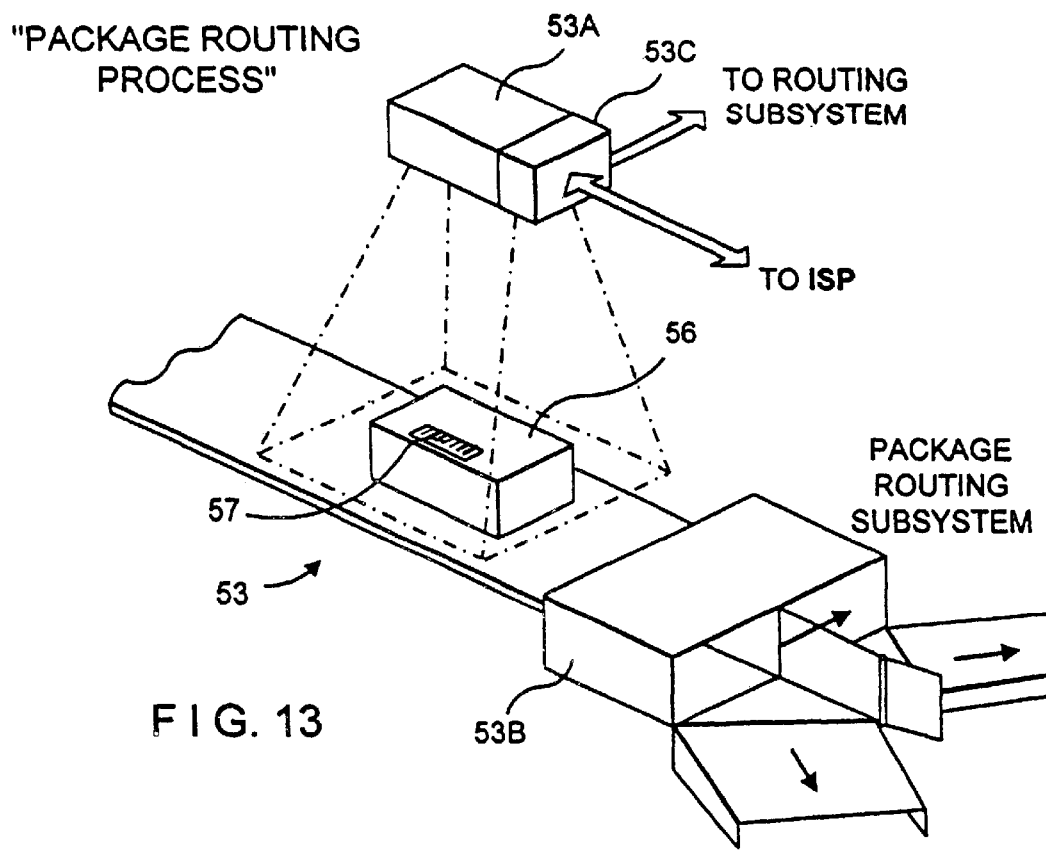
FIG. 13 is a schematic diagram of a Package Routing Subsystem located at a routing hub within the RTD system of the present invention, shown scanning a URL/ZIP-CODE encoded bar code symbol on a shipped package being routed therewithin.

As shown in FIG. 13, each hub within the RTD system will typically have a number of Package Routing Subsystems 53 located along a high-speed conveyor belt subsystem. The function of each Package Routing Subsystem is to sort and route packages to collection stations within the hub, from which they are then transported to the next location along a route terminating at the final destination specified for the package. In the US Postal System, and United Parcel Service (UPS) system, the package destination is specified by the ZIP CODE of the destination address. In the illustrative embodiment, each Package Routing Subsystem 53 comprises a number of subcomponents, namely: a Metrologic Holotrak™ laser-scanning holographic bar code symbol reader 53A, as taught in copending application Ser. No. 08/573,949 filed Dec. 18, 1995, incorporated herein by reference in its entirety; an Internet Access Terminal as disclosed in FIGS. 1 and 2 and described in detail above, connected to an ISP within the infrastructure of the Internet, and transmitting package tracking information (e.g., Package Routing Subsystem identification number, and time and date of routing operation, etc.) to the Web-page based information storage location specified by the package's assigned URL; package routing machinery 53B for routing packages along a conveyor pathway that passes through the Routing Subsystem, and terminates within at a collection station, from which the package will be shipped along a route that eventually terminates at the package's destination address; and a subsystem controller 53C for controlling the operation of the package routing machinery 53B in response to ZIP CODE information produced from the bar code symbol reader 53A during each package scanning operation.

The Portable Package Delivery (PPD) Subsystem

Figure 15:
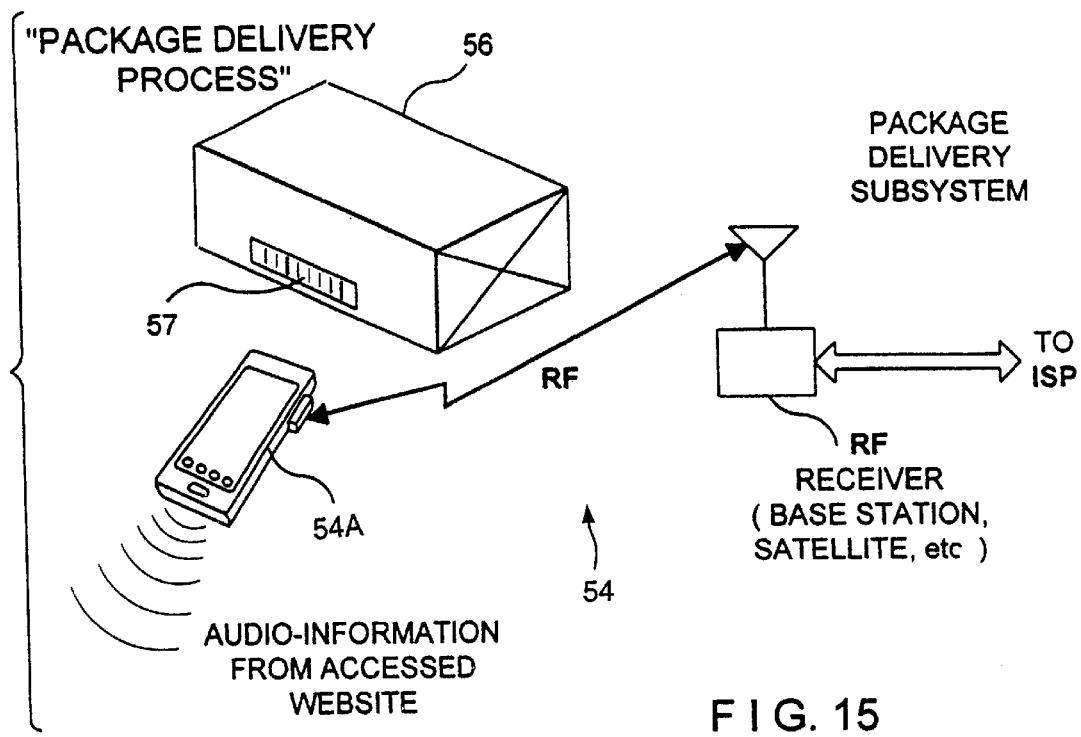
FIG. 15 is a schematic diagram of a portable Package Delivery Subsystem of the present invention shown scanning the URL/ZIP-CODE encoded bar code symbol on a shipped package during a package delivery operation within the RTD system of the present invention.

As illustrated in FIG. 15, each PPD subsystem 54 is preferably realized as a transportable device of the type shown in FIG. 13 and described in detail above. The function of each PPD subsystem 54 is to provide wireless access to the RDBMS of the RTD Internet Server 51 during package delivery operations. Using portable Internet Access Terminal 54, the delivery person can automatically connect with the RTD Internet Server Subsystem 51 and access the corresponding RTD information file maintained (within the RDBMS thereof) on any particular package within the system by simply reading the URL-encoded bar code symbol. Such accessible information can include multimedia-type information pertaining to: package content specifications; package shipping information, package delivery instructions (e.g., date, time and location of delivery), shipping and handling terms; audio and/or audio visual messages associated with a particular shipped package; etc. By virtue of the fact that RTD information records are linked with URLs within the RTD Server Subsystem, any information element within a RTD information record can be dynamically changed, updated or deleted while its corresponding package or parcel is in transit through the RTD system. Consequently, shipping instructions (e.g., shipping address, shipping time and date, and recipient) can be dynamically changed after the package has been shipped and is in route to its destination. Such flexibility is prohibited when using preprinted 2-D bar code symbols inherently containing information that is statically-encoded at the time of package log-in/shipment.

Operation of the Web-based Package RTD System

Figure 12:
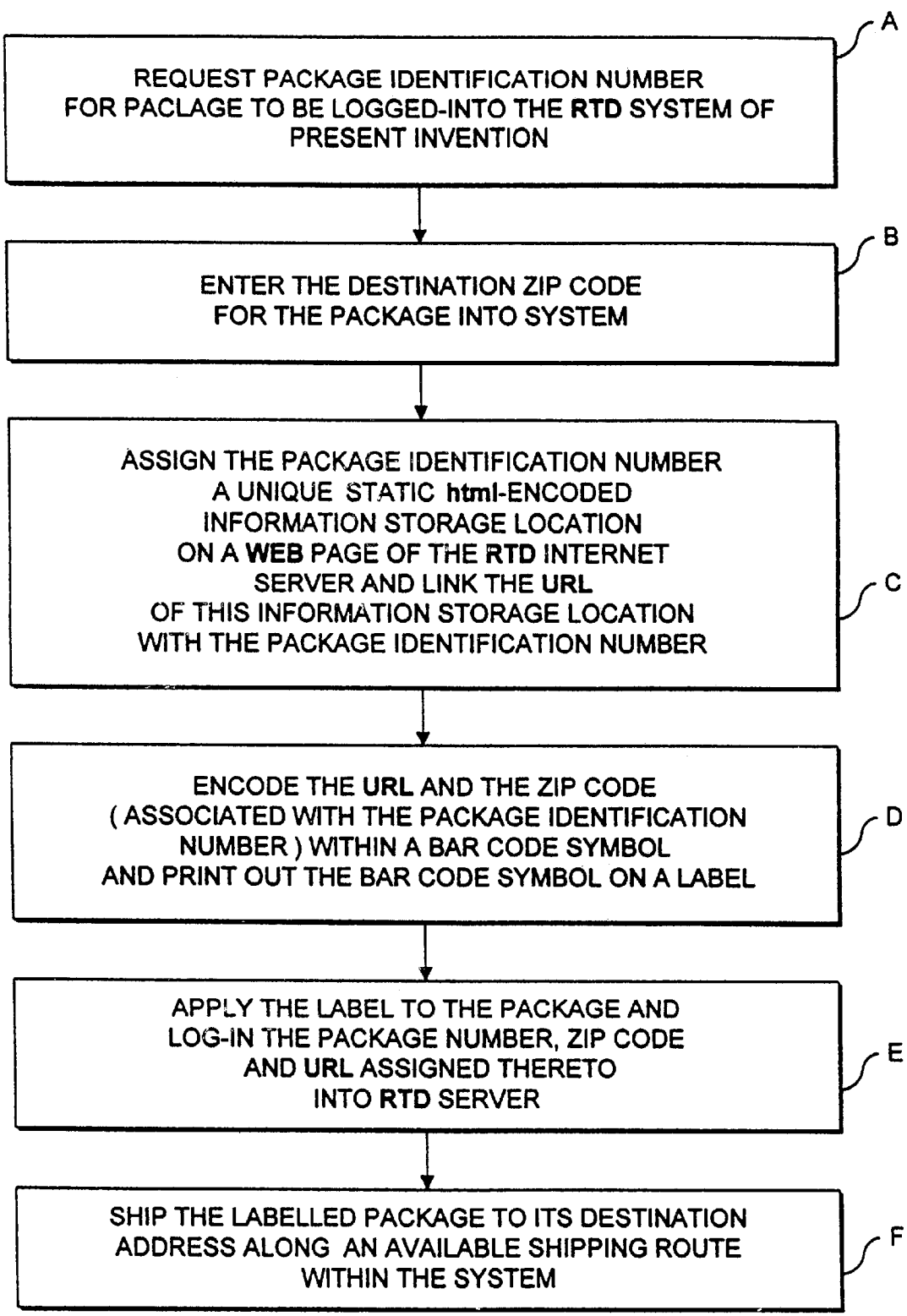
FIG. 12 is a flow chart illustrating the steps carried out at the Package Log-In/Shipping Subsystems during a package logging-in operation within the RTD system of the present invention.

As indicated at Block A of FIG. 12, the package log-on/shipping procedure begins by assigning a package identification number (PIN) to the package to be logged-into the RTD system of the present invention. This procedure involves the use of the Package Log-In/Shipping Computer Subsystem 52 illustrated in FIG. 9 and the RTD Internet Server Subsystem 51 shown in FIG. 11. The request for a new package identification number is transmitted from the Package Log-In/Shipping Computer 52 to the RTD Internet Server 51 using electronic forms sent by way of HTTP well known in the Internet art. Then at Block B, the Package Log-in/Shipping Computer 52 is used to send the identified destination ZIP CODE for the package to the RTD Server 51. At Block C, the RTD Server assigns the package (and thus the package identification number) a unique HTML-encoded information storage location on a web-page of the RTD Internet Server and then links the URL of this information storage location with the package identification number. Then at Block D, the Package Log-In/Shipping Computer 52 encodes the URL and the ZIP CODE (associated with the package identification number) within a bar code symbol information structure of either 1-D or 2-D bar code symbology, and then prints out the bar code symbol on a label. Then at Block E, the printed bar code label is applied to the package, and thereafter the Package Log-In/Shipping Computer 52 transmits a confirmation request to the RTD Internet Server 51 confirming entry of the package identification number, Zip Code and URL assigned thereto into the RDBMS of the System. As indicated at Block F, upon receiving confirmation from the RTD Internet Server 51 that such information elements are recorded in the RDBMS, the labelled package is released for shipment to its destination by way of a shipping route available within the RTD system. The above procedure is repeated for each and every package that is to be shipped using the system.

As each package is transported through the RTD system, it is moved through one or more Package Routing Subsystems, as shown in FIG. 13. As each package is scanned by the bar code symbol reader 53A at a Package Routing Subsystem, a package routing/tracking procedure is automatically carried out. This procedure is outlined in the flow chart of FIG. 14 described below.

Figure 14:
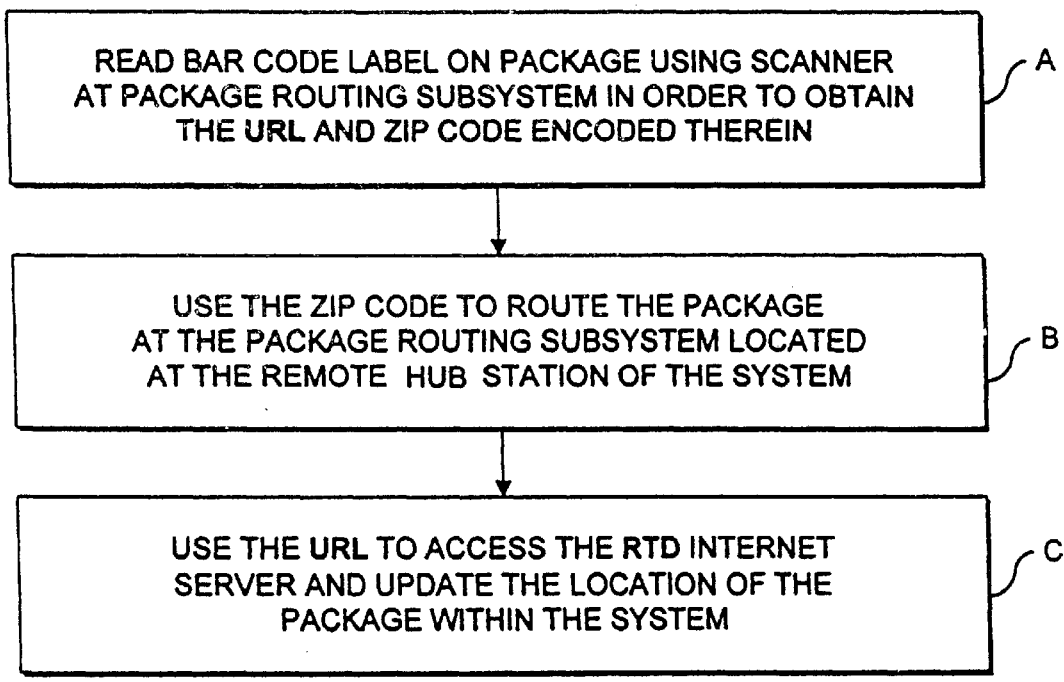
FIG. 14 is a flow chart illustrating the steps carried out at each Package Routing Subsystem upon the reading of a URL/ZIP-CODE encoded bar code symbol on a package during a package routing operation within the RTD system of the present invention.

As indicated at Block A of FIG. 14, the bar code scanner at the Package Routing Subsystem reads the URL/ZIP-CODE encoded bar code symbol on the package and obtains the information representative of the URL and the Zip Code. Then, at Block B, the Package Routing Subsystem uses the locally-recovered Zip Code to route the package at the Package Routing Subsystem at the hub station of the system. Then at Block C, the Routing Subsystem uses the obtained URL to access the RTD Internet Server by way of HTTP and update the location of the scanned package within the RDBMS of the system. Each time the package is scanned at a different Package Routing Subsystem, or other Internet Access Terminal located within the RTD system, the current location of the scanned package within the System is updated, by ensuring that each HTTP request sent to the RTD Internet Server (by the Package Routing Subsystem) includes information identifying the requesting Package Routing Subsystem.

When the package finally arrives at the hub nearest its destination, it typically is loaded upon a truck or like vehicle for delivery. Then it is delivered to its destination according to the delivery procedure described generally in the flow chart of FIG. 18 and described below.

Figure 16:
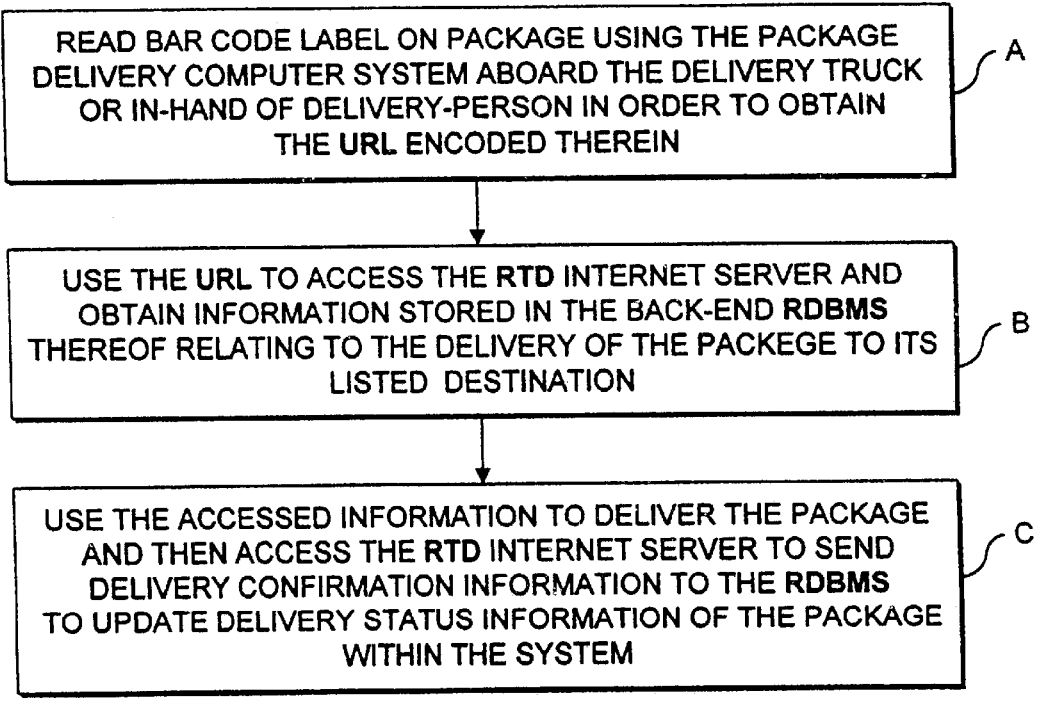
FIG. 16 is a flow chart illustrating the steps carried out during a package delivery operation using a portable Package Delivery Subsystem of the present invention.

As indicated at Block A of FIG. 16, the delivery person uses the Portable Delivery Computer 54 hereof to read the URL/ZIP-CODE encoded label on the package in order to recover the URL encoded therein. The Portable Delivery Computer can be mounted within the delivery vehicle or held in the hand of the delivery person. As indicated at Block B, the Portable Delivery Computer automatically connects to the RTD Internet Server 51 by way of HTTP using the locally recovered URL encoded in the scanned bar code symbol. As indicated at Block C, the information elements shown in FIG. 11B, that are associated with the RDBMS information record linked to the URL, are automatically displayed on the display screen of the Package Delivery Computer 53. Such information, particularly the package delivery instructions, are then used to deliver the package to its destination. Such information can be of a multimedia nature, including audio instructions and graphical images of delivery maps to facilitate the delivery process.

In the illustrative embodiment of the RTD system described above, packages being shipped within the system have been labelled with bar code symbols that have been encoded with both URL and ZIP-CODE information. The reason that ZIP CODE information is encoded in the bar code symbol (along with the URL) is that the ZIP CODE can be locally recovered very quickly at a Package Routing Subsystem 53 and used to route packages moving along the conveyor belt system at high speeds. Alternatively, however, the locally recovered URL can be used to connect to the RTD Internet Server 51, access its RDBMS, and acquire the ZIP CODE of any particular package that has been scanned by the Package Routing Subsystem. However, as the time required to access such information from the RTD Internet Server 51 typically will be greater than the residency time of the package moving through the Package Routing Subsystem, it will be desirable in many instances to use a locally recovered ZIP CODE to carry out package routing operations described hereinabove.

Figure 10A:
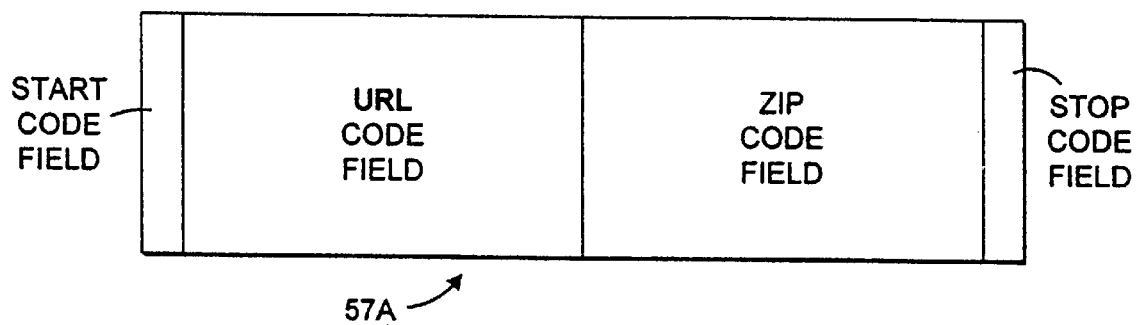
FIG. 10A is a schematic diagram showing the various information fields of a first, preferred illustrative embodiment of a URL/ZIP-CODE encoded bar code symbol for use with the RTD system hereof.
Figure 10B:
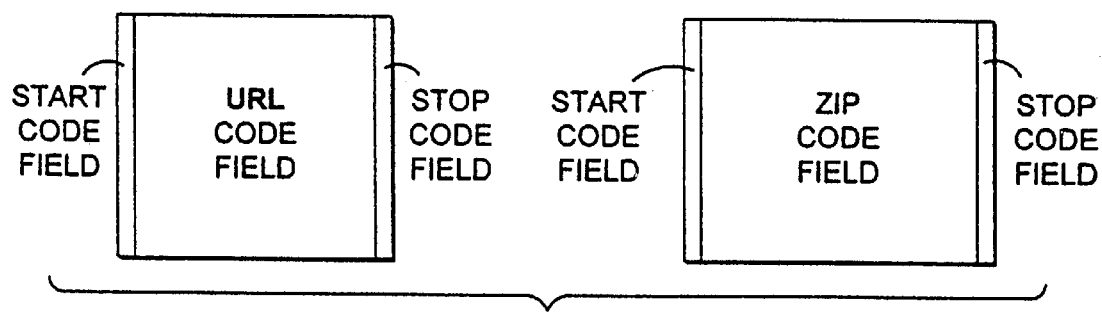
FIG. 10B is a schematic diagram showing the various information fields of a second illustrative embodiment of URL/ZIP-CODE encoded bar code symbol for use with the RTD system hereof.

In an alternative embodiment of the present invention, the URL and the ZIP-CODE can be encoded in separate bar code symbol information structures, as indicated in FIG. 10B. The bar code symbols of this composite information structure can be placed side by side, stacked above and below one another, or randomly on the surface(s) of the package.

In either of the illustrative embodiments of the RTD system described, an improved method of globally routing, tracking and delivering packages, parcels and objects alike is provided. At the same time, this system avoids the shortcomings and drawbacks associated with the use of statically-encoded 2-D bar code symbols and prior art integrated scanning terminals for reading the same. Unlike 2-D bar code symbols, the RTD system of the present invention can be used to provide multi-media instructions to delivery personnel to improve package delivery operations worldwide. Also, audio-visual messages, linked to a particular package, can be stored on the RTD Internet Server 51 by the sender of the package and delivered to the package Recipient at the time of delivery, to provide a "singing or voice telegram" type message along with the package. The point of delivery message can also provide images and short video clips for visual display to enhance the package delivery process in ways unattainable using prior art delivery techniques. Optionally, such multi-media messages can be downloaded from the Portable Package Delivery Subsystem 54 onto an information storage device (e.g., floppy disc, ZIP® 100 Megabyte storage device from Iomega, Inc., etc.) and delivered with an accompanying parcel at the point of delivery.

The RTD System of the present invention can be modified to provide a web-based Document Tracking and Delivery System for use within various types of organizations. In such an alternative embodiment of the present invention, a Document Log-In Computer Subsystem, similar to the Subsystem of FIG. 9, would be used to log-in documents with the System. There would be no need for a Package Routing Subsystem, as employed in the system of FIG. 8, nor the use of URL/ZIP-CODE encoded bar code symbols. Rather, URL-encoded bar code symbols of the type shown in FIGS. 1C(1), 1C(2), 1D(1) or 1D(2) would be placed on documents being tracked within the system. Also, a web-based Document Tracking and Delivery Server, similar to the RTD Server of FIG. 11, would be used to store document tracking and delivery information, as well as information (including e-mail messages sent to others within the organization) pertaining to the document as it is received by others within the system. An advantage of such a system would be that hard-copy documents can be circulated within an organization, and those wishing to comment on them can quickly access the Document Tracking/Delivery Server by reading the printer URL-encoded bar code symbol on it, in order to append messages and notes to the database records associated with the document, and allow others along the review chain to follow all that has occurred. Documents to be tracked within the system can be physical specimens, drawings, 3-D articles, letters, memos, photographs and the like.

In other embodiments of the present invention, URL-encoded bar code symbols can be printed on diverse types of objects, articles or products in order to enable users to access information resources in the Internet, relating to such URL-encoded objects, articles and products, by scanning such URL-encoded bar code symbols using the programmed bar code symbol readers of the present invention.

It is understood that the Internet Access System of the illustrative embodiments may be modified in a variety of ways in order to carry out the various aspects of the present invention. All such modifications and variations of the illustrative embodiments thereof are deemed to be within the scope and spirit of the present invention as defined by the accompanying Claims to Invention.

What is claimed is:

1. A bar code driven information access system for accessing information resources on the Internet, comprising:

an Internet terminal having an Internet browser program operably connected to a programmed bar code symbol reader, for interconnecting to the Internet infrastructure by way of an Internet Service Provider (ISP) using a communications media and carrying out the client-side of the Internet protocol (IP) required to access and display an Internet information resource specified by a URL encoded within a bar code symbol readable by said programmed bar code symbol reader;

wherein said programmed bar code symbol reader includes an optical scanning device for optically scanning said bar code symbol encoded with the URL of said Internet information resource to be accessed, a scan data processor for producing words of digital scan data representative of the width of the bars and spaces of said URL-encoded bar code symbol, programmable decoder module for processing said words of digital scan data and producing symbol character data representative of said decoded bar code symbol;

an ASCII code generation module for generating
(1) an ASCII-based prefix code string representative of the Internet browser program command that writes digital scan data representative of the URL into said Internet browser program, and
(2) a suffix code string representative of the Internet browser program command that executes a HTTP request on the URL entered into said Internet browser program, a code string synthesizer module for synthesizing the prefix and suffix code strings produced from said ASCII-based code generator, with the URL character string from said programmable decoder module, in order to form a complete code string, and a data transmission module for transmitting said complete code string to said Internet browser program for use in accessing and displaying said Internet information resource specified by said URL encoded within the decoded bar code symbol.

2. The bar code driven information access system of claim 1, wherein said optical scanning device and said scan data processor comprises a bar code laser scanner.

3. The bar code driven information access system of claim 1, wherein said optical scanning device and said scan data processor comprises a CCD-based bar code scanner.

4. The bar code driven information access system of claim 1, wherein said Internet access terminal and said programmed bar code symbol reader comprises a hand-supportable device having a display panel and a data entry mechanism, wherein said display terminal, said data entry mechanism and said programmed bar code symbol reader are integrated with said hand-supportable housing.

5. The bar code driven information access system of claim 4, wherein said communications media comprises a wireless communication link, and said Internet access terminal is interconnected to the Internet infrastructure by way of said wireless communication link.

6. The bar code driven information access system of claim 1, wherein programmed bar code symbol reader is a laser scanning bar code symbol reader.

7. The bar code driven information access system of claim 1, wherein said Internet access terminal comprises a desktop computer.

8. A hand-supportable bar code driven information access system for accessing information resources on the Internet, comprising:

a hand-supportable housing;

a programmed bar code symbol reader, integrated within said hand-supportable housing, for reading a bar code symbol encoded with an Uniform Resource Locator (URL) specifying the location of an Internet information resource to be accessed and displayed;

a computing platform, disposed within said hand-supportable housing, and supporting an Internet browser program operably connected to said programmed bar code symbol reader, for carrying out the client-side of the Internet protocol (IP) required to access and display said Internet information resource specified by said URL-encoded within said bar code symbol;

a network communication device for interconnecting said Internet browser program to the Internet infrastructure by way of a wireless communications link;

a display panel, integrated with said hand-supportable housing, for displaying said Internet information resource specified by said URL encoded within said bar code symbol;

a data entry mechanism, integrated with said hand-supportable housing, for entering data into said Internet browser program;

wherein said programmed bar code symbol reader includes an optical scanning device for optically scanning said bar code symbol encoded with the URL of said Internet information resource to be accessed and displayed, a scan data processor for producing words of digital scan data representative of the width of the bars and spaces of said URL-encoded bar code symbol, a programmable decoder module for processing said words of digital scan data and producing symbol character data representative of said decoded bar code symbol, a code generation module for generating (1) a prefix code string representative of the Internet browser program command that writes digital scan data representative of the URL into said Internet browser program, and (2) a suffix code string representative of the Internet browser program command that executes a HTTP request on the URL entered into said Internet browser program, a code string synthesizer module for synthesizing the prefix and suffix code strings produced from said code generator, with the URL character string from said programmable decoder module, in order to form a complete code string, and a data transmission module for transmitting said complete code string to said Internet browser program for use in accessing and displaying said Internet information resource specified by said URL encoded within the decoded bar code symbol.

9. The bar code driven information access system of claim 8, wherein said optical scanning device and said scan data processor comprises a laser scanning bar code symbol scanner.

10. The bar code driven information access system of claim 8, wherein said optical scanning device and said scan data processor comprises a CCD-based bar code symbol scanner.

11. The bar code driven information access system of claim 8, wherein programmed bar code symbol reader is a laser scanning bar code symbol reader.

12. The bar code driven information access system of claim 8, wherein said prefix code string and said suffix code string are realized as ASCII-based code strings.

* * * * *